(12) United States Patent
Rahman et al.

(10) Patent No.: US 8,659,209 B2
(45) Date of Patent: Feb. 25, 2014

(54) TRANSDUCER

(75) Inventors: Ahmed Yehia Amin Abdel Rahman, Lyndhurst (GB); Jonathan Geoffrey Gore, Woking (GB); Fiona Louise Lowrie, Farnborough (GB); Richard Carson McBride, Kilkeel (GB)

(73) Assignee: Qinetiq Limited, London (GB)

( * ) Notice: Subject to any disclaimer, the term of this patent is extended or adjusted under 35 U.S.C. 154(b) by 158 days.

(21) Appl. No.: 13/414,816

(22) Filed: Mar. 8, 2012

(65) Prior Publication Data

US 2012/0217845 A1 Aug. 30, 2012

Related U.S. Application Data

(62) Division of application No. 12/739,649, filed as application No. PCT/GB2008/003672 on Oct. 30, 2008, now Pat. No. 8,159,114.

(30) Foreign Application Priority Data

| Nov. 1, 2007 | (GB) | 0721445.5 |
| Nov. 1, 2007 | (GB) | 0721447.1 |
| Jan. 22, 2008 | (GB) | 0801079.5 |

(51) Int. Cl.
 *H01L 41/09* (2006.01)
(52) U.S. Cl.
 USPC .................................................. 310/328
(58) Field of Classification Search
 USPC .................................................. 310/328
 See application file for complete search history.

(56) References Cited

U.S. PATENT DOCUMENTS

| 3,781,576 A | 12/1973 | Runde et al. |
| 4,471,256 A | 9/1984 | Igashira et al. |
| 4,619,320 A | 10/1986 | Adnyana et al. |
| 4,808,874 A | 2/1989 | Stahlhuth |

(Continued)

FOREIGN PATENT DOCUMENTS

| EP | 0 751 489 A2 | 1/1997 |
| EP | 1 252 414 B1 | 10/2006 |

(Continued)

OTHER PUBLICATIONS

Gore, J. et al., "High Temperature Shape Memory Alloy Actuators for Down-hole Flow Control Valves for Oil Wells," *Actuator 2006, 10th International Conference on New Actuators*, Jun. 14-16, 2006.

(Continued)

*Primary Examiner* — Thomas Dougherty
(74) *Attorney, Agent, or Firm* — Oliff PLC

(57) ABSTRACT

A multistage flextensional transducer includes at least one inner elongate driver member within and mechanically coupled to an inner shell that is nested within an outer shell; the inner shell comprising a pair of contact portions abutting the driver member and a pair of transmission portions on opposite sides of the inner shell between the contact portions; the outer shell being arranged so that the transmission portions act as bridging driver members between the said inner and outer shells, flexure of the outer shell being driven, on actuation of the transducer, by movement of the bridging driver members. The transducer may act as a push or pull actuator or sensor, may magnify displacement and may employ smart materials as driver members. Also cylindrical modules containing thin flextensional actuators may provide axial displacement in a downhole environment and may move a device axially along a downhole pipe or close a valve opening or inch along the pipe.

17 Claims, 32 Drawing Sheets

(56) References Cited

U.S. PATENT DOCUMENTS

| | | | |
|---|---|---|---|
| 4,845,688 | A | 7/1989 | Butler |
| 4,894,811 | A | 1/1990 | Porzio |
| 4,975,615 | A | 12/1990 | Katahara |
| 4,976,553 | A | 12/1990 | Yamaguchi et al. |
| 4,979,568 | A | 12/1990 | Spencer, III et al. |
| 5,030,873 | A | 7/1991 | Owen |
| 5,063,542 | A | 11/1991 | Petermann et al. |
| 5,155,709 | A | 10/1992 | Flanagan et al. |
| 5,199,497 | A | 4/1993 | Ross |
| 5,306,979 | A | 4/1994 | Schwarz, Jr. |
| 5,332,942 | A | 7/1994 | Rennex |
| 5,508,976 | A | 4/1996 | Pauer |
| 5,729,077 | A | 3/1998 | Newnham et al. |
| 5,768,216 | A | 6/1998 | Obata et al. |
| 5,849,125 | A | 12/1998 | Clark |
| 5,926,439 | A | 7/1999 | Piquette |
| 6,140,745 | A | 10/2000 | Bryant |
| 6,216,779 | B1 | 4/2001 | Reinhardt |
| 6,278,658 | B1 | 8/2001 | Skinner et al. |
| 6,400,649 | B2 | 6/2002 | Skinner et al. |
| 6,465,936 | B1 | 10/2002 | Knowles et al. |
| 6,654,316 | B1 | 11/2003 | Butler et al. |
| 6,717,333 | B2 | 4/2004 | Hermle et al. |
| 6,737,788 | B2 | 5/2004 | Moler et al. |
| 6,742,585 | B1 | 6/2004 | Braithwaite et al. |
| 6,927,528 | B2 | 8/2005 | Barillot et al. |
| 7,111,675 | B2 | 9/2006 | Zisk, Jr. |
| 7,132,781 | B2 | 11/2006 | Moler et al. |
| 2002/0005681 | A1 | 1/2002 | Koopmann et al. |
| 2004/0035106 | A1 | 2/2004 | Moler et al. |
| 2006/0146096 | A1 | 7/2006 | Wright et al. |
| 2007/0206441 | A1 | 9/2007 | Porzio |
| 2011/0198447 | A1 | 8/2011 | Baudasse |

FOREIGN PATENT DOCUMENTS

| | | |
|---|---|---|
| GB | 1 405 727 | 9/1975 |
| GB | 2 168 568 A | 6/1986 |
| GB | 2 425 328 A | 10/2006 |
| JP | A-4-359684 | 12/1992 |
| JP | A-7-249392 | 9/1995 |
| WO | WO 97/41454 | 11/1997 |
| WO | WO 01/12345 A1 | 2/2001 |
| WO | WO 01/57358 A1 | 8/2001 |

OTHER PUBLICATIONS

Leblanc, L., "Materials Science: Part I-'Smart Metals' Providing Actuation, Sealing, and Completion Functions Downhole," *Offshore*, Dec. 1, 2001, pp. 1-3, vol. 61, No. 12.

"Piezoelectric Actuators and Stages for Micropositioning and Nanopositioning Applications," *DSM product brochure*, pp. 1-3, Retrieved from http://www.dynamic-structures.com/piezo_actuators.html on Mar. 30, 2007.

Xu, W. et al., "Flexure Hinges for Piezoactuator Displacement Amplifiers: Flexibility, Accuracy, and Stress Considerations," *Precision Engineering*, Jul. 1996, pp. 4-10, vol. 19, No. 1.

Leblanc, L., "Part II: Smart Metals Providing Actuation, Sealing, and Connection Functions Downhole," *Offshore*, Jan. 1, 2002, pp. 1-4, vol. 62, No. 1.

Ueda, J. et al., "Design of PZT Cellular Actuators with Power-law Strain Amplification," *Proceedings of the 2007 IEEE/RSJ International Conference on Intelligent Robots and Systems*, Oct. 29-Nov. 2, 2007.

Aracii. R. et al., "Parallel Robots for Autonomous Climbing Along Tubular Structures," *Robotics and Autonomous Systems*, 2003, pp. 125-134, vol. 42, No. 2.

International Search Report issued in International Application No. PCT/GB2008/003672 on Aug. 20, 2009.

Written Opinion of the International Searching Authority issued in International Application No. PCT/GB2008/003672 on Aug. 20, 2009.

International Preliminary Report on Patentability issued in International Application No. PCT/GB2008/003672 on May 4, 2010.

British Search Report issued in British Application No. GB0721447.1 on Jan. 25, 2008.

British Search Report issued in British Application No. GB0721445.5 on Jan. 25, 2008.

British Search Report issued in British Application No. GB0801079.5 on May 2, 2008.

U.S. Appl. No. 12/739,072, filed Apr. 21, 2010 in the name of Ahmed Yehia Amin Abdel Rahivian et al.

International Search Report issued in related International Application No. PCT/GB2008/003664 on Mar. 3, 2009.

Written Opinion of the International Search Authority issued in related International Application No. PCT/GB2008/003664 on Mar. 3, 2009.

International Preliminary Report on Patentability issued in International Application No. PCT/GB2008/003664 on May 4, 2010.

British Search Report issued in British Application No. GB0721433.1 on Jan. 4, 2008.

May 18, 2011 Office Action issued in U.S. Appl. No. 12/739,649.

Nov. 17, 2011 Quayle Action issued in U.S. Appl. No. 12/739,649.

Dec. 14, 2011 Notice of Allowance issued in U.S. Appl. No. 12/739,649.

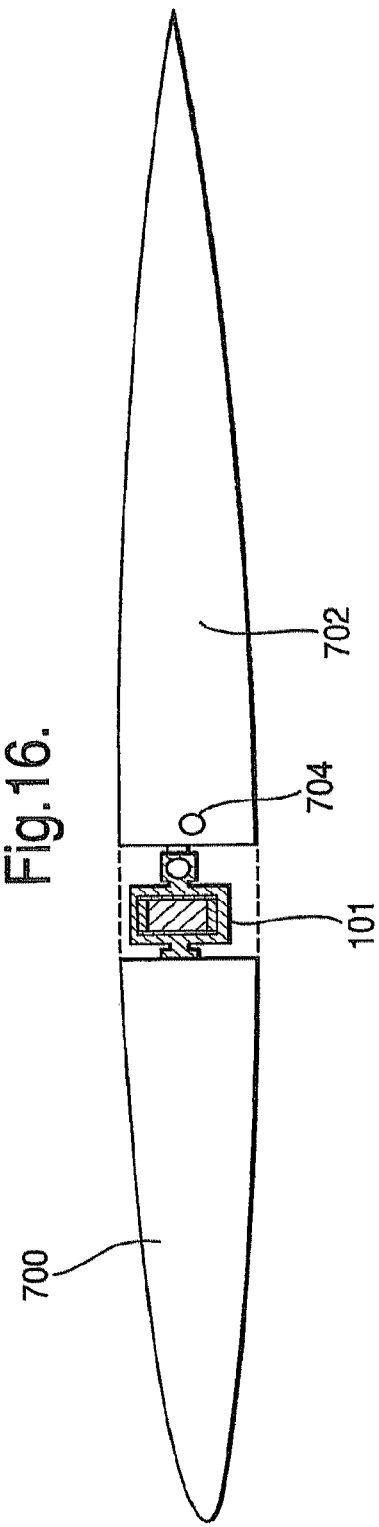
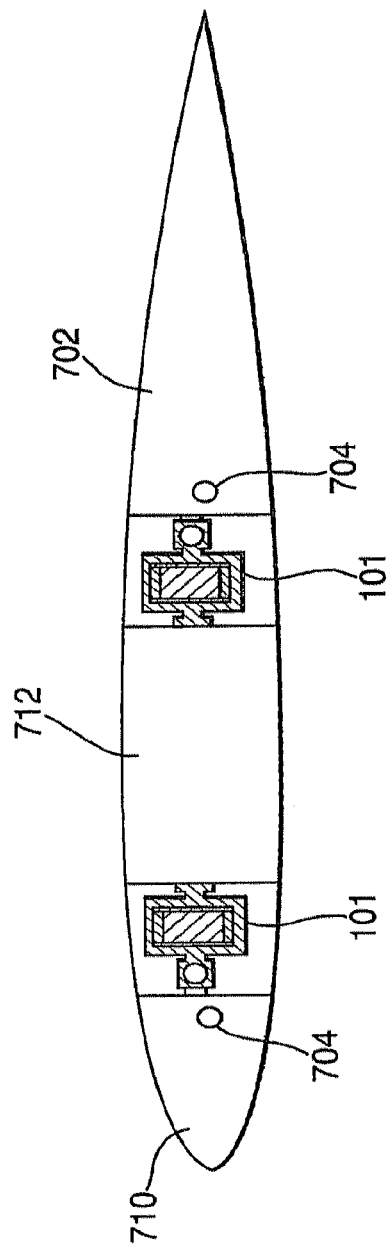

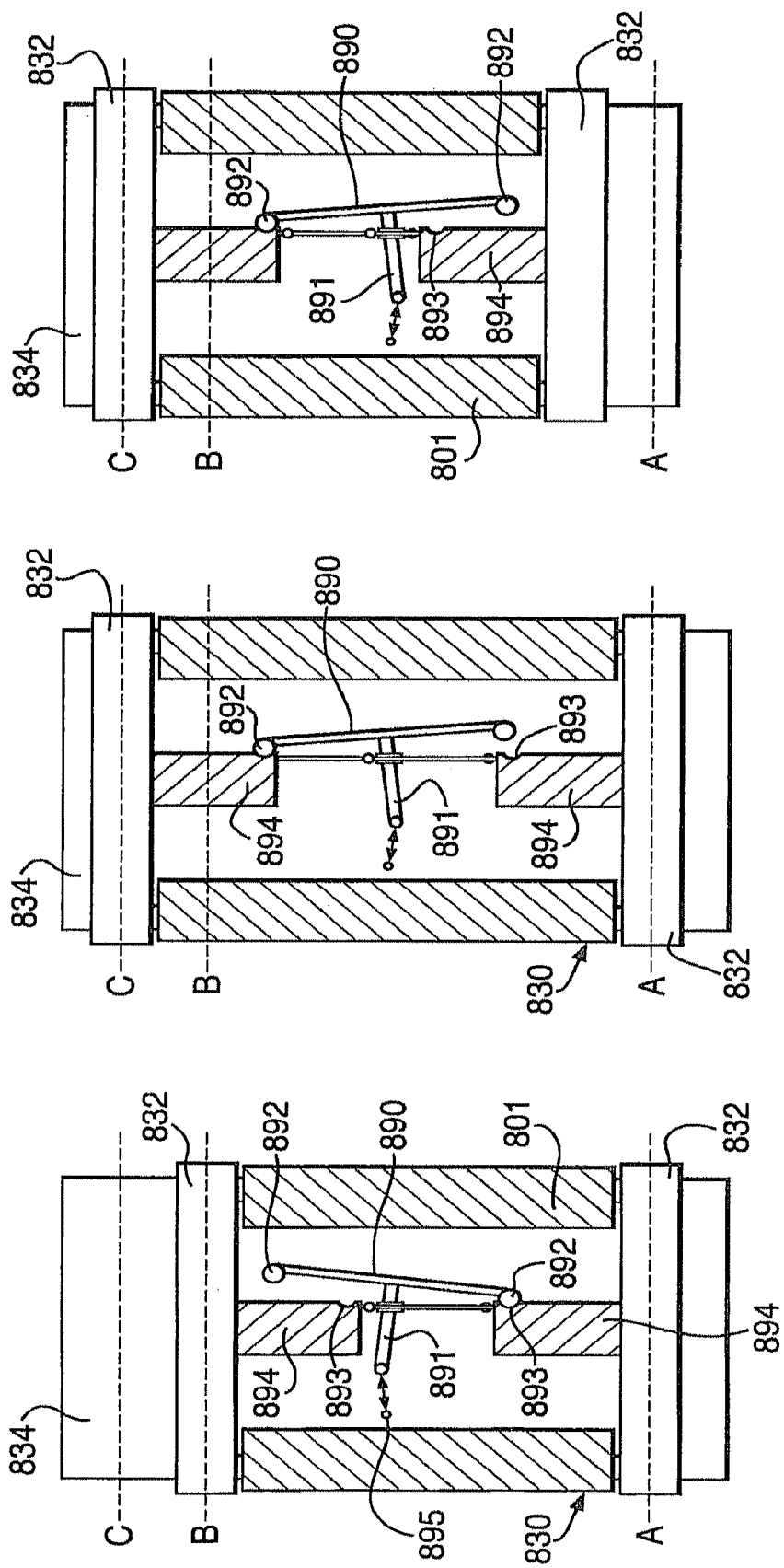

Deflection Measured from Two Stage Flextensional Actuator

TRANSDUCER

This is a Division of application Ser. No. 12/739,649 filed Apr. 23, 2010, which in turn is a National Stage of International Application No. PCT/GB2008/003672 filed Oct. 30, 2008, which claims the benefit of British Patent Application Nos. 0721445.5 filed Nov. 1, 2007; 0721447.1 filed Nov. 1, 2007; and 0801079.5 filed Jan. 22, 2008. The disclosures of the prior applications are hereby incorporated by reference herein in their entirety.

This invention relates to flextensional transducers and their applications in various industries. Of specific interest are flextensional transducers that comprise novel housing shell arrangements, preferably transducers capable of translating an input displacement or force into an amplified displacement or force in the same or a different direction. The invention also relates to modules and assemblies for using actuator transducers to provide axial displacement in a downhole environment.

Flextensional transducers are known in the prior art and comprise a flextensional housing shell containing an elongate member. A flextensional housing shell is a housing shell which, as the name suggests is flexible, and which can change the direction of a generated displacement (or force). A flextensional housing shell generally also amplifies this displacement (or force). Known flextensional transducers operate as actuators or as sensors. Where the transducers operate as actuators, the contained elongate member provides a driver exerting a force or displacement in one direction onto the housing, which then flexes to generate a displacement or force in another, typically orthogonal, direction, usually an amplified displacement or force, relative to the initial displacement or force provided by the elongate driver. Where the transducers operate as sensors, an external source exerts an input displacement or force on the flextensional housing, which then flexes to generate a displacement or force on the contained elongate member, generally an amplified displacement or force relative to the initial input displacement or force on the flextensional housing, in a different direction from the input displacement or force. Generally the contained elongate member is arranged to provide an output signal as an indicator of the detected force or displacement.

U.S. Pat. No. 4,845,688 describes a flextensional acoustic transduction device comprising a shell having orthogonally disposed major and minor shell axes and a transduction drive means in the form of a piezoelectric stack. In operation the piezoelectric stack expands during a positive cycle of an alternating voltage causing outward movement of opposed shell ends along the major shell axis. The shell then flexes, which causes orthogonal surfaces and connected end mounts of the shell to move inwards by a magnified displacement along the minor axis of the housing shell. On the negative cycle, the process reverses and the ends mounts move outwards as the piezoelectric stack decreases in length. One embodiment described in this prior art reference uses orthogonally disposed and commonly interconnected shells, the piezoelectric driver comprising a plurality of piezoelectric pieces arranged in a cross pattern. In another embodiment of this reference two flextensional cells, each with its own piezoelectric stack are secured one above the other to increase the displacement achieved. U.S. Pat. Nos. 5,729,077 and 6,465,936 similarly describe flextensional transducer assemblies in which a number of flextensional cells are stacked so as to provide greater displacement.

U.S. Pat. No. 5,508,976 describes a mechanical transformer ring made up of a plurality of flextensional transducer ovals, each of which receives a transducer driver stack along its major axis. In operation an alternating voltage is applied to the driver stacks causing them to expand and contract. This results in a corresponding vibration along the minor axis of each flextensional oval. Since the minor axes of the flextensional ovals extend around the circumference of the mechanical transformer ring, the entire diameter of the ring is caused to vibrate.

As noted above the invention also relates to modules and assemblies for using actuator transducers to provide axial displacement in a downhole environment. Certain embodiments according to the invention find particular application in the operation of fluid flow control valves, especially downhole flow control valves for use in oil or gas wells, and also in other downhole applications.

In a downhole environment various devices, such as valves (e.g. flow control valves or safety valves) need to be activated from time to time. Generally the devices are arranged so that they are activated by being axially displaced relative to the downhole pipe. This is achieved by mounting some sort of actuator next to the device which is then activated in some way to operate the device. Different forms of activation mechanisms, including hydraulic, mechanical, or electrical mechanisms may be used. Mechanical activation typically involves lowering some type of setting or shifting tool to a desired depth to engage the downhole device to apply a force to move an actuator operably coupled to the downhole device. Hydraulic actuation typically involves application of hydraulic pressure either through tubing, a tubing casing annulus, or a hydraulic control line, to an actuator in a downhole device. Electrical actuation typically involves communicating electrical power down an electrical cable to a controller, motor or solenoid actuator.

For example, U.S. Pat. No. 4,619,320 describes a subsurface safety valve assembly for an oil well comprising a valve element and a temperature responsive operator comprising multiple coil springs made of shape memory material aligned axially in the vertical well bore and operable in opposing directions for opening and closing the valve elements. The shape memory alloy springs are heated by passing an electrical current through them to cause them to increase their pitch to move a rotating ball valve axially relative to the well bore between an open and closed position.

U.S. Pat. No. 6,216,779 describes an apparatus for orienting a downhole tool such as a logging tool relative to a borehole. The apparatus comprises a shape memory alloy rod which lengthens and shortens axially relative to the downhole bore to collapse and extend articulated centring arms of the downhole tool to engage and disengage the borehole wall.

The paper "High Temperature Shape Memory Alloy Actuators for Downhole Flow Control Valves for Oil Wells" by Gore, Forsyth et al, presented at the "Actuator 2006, 10th International Conference on New Actuators", 14-16 Jun. 2006, in Bremen, Germany, describes a SMA actuator for a specific down hole valve application, which is a "single-shot" actuation in which a valve is moved from a fully open configuration to a fully closed configuration. The paper describes a hybrid hydraulic-SMA approach in which a stored hydrostatic pressure is released by activation by a SMA actuator, and this released pressure acts on a sliding sleeve assembly to close the valve.

U.S. Pat. No. 6,742,585 describes a device that undergoes axial contraction in order to achieve radial expansion for sealing off openings through the wall of a well-tubular that is lining a borehole in a hydrocarbon well. The device comprises a pair of annular activator rings that are connected to each other by a plurality of shape memory alloy rods that contract above a pre-selected temperature. The annular activator rings present a wedge shaped surface at their circumference which are urged against elastomeric seal collars when the shape memory alloy rods contract, thereby forming a seal to the well-tubular.

A first aspect of the present invention provides a flextensional transducer comprising at least one inner elongate driver member, contained within and mechanically coupled to an inner flextensional housing shell, which is itself nested within an outer flextensional housing shell; the inner shell comprising a pair of contact portions and a pair of transmission portions, the contact portions being located so that they are in mechanical contact with opposite ends of the at least one inner driver member, and the transmission portions being located on opposite sides of the inner housing shell between the contact portions; and the outer housing shell being arranged so that the transmission portions of the inner housing shell act as bridging driver members between the said inner and outer housing shells, flexure of the outer flextensional housing shell being driven, on actuation (i.e. upon activation or operation) of the transducer, by movement of the said bridging driver members, or vice versa.

Transducers according to the invention fall into two main categories: actuators and sensors.

In the first category of actuators, on actuation, a change in length of the inner driver member can be generated by application of an external stimulus which moves the contact portions of the inner housing shell relative to each other causing the inner housing shell to flex causing a consequent movement of the transmission portions of the inner housing shell relative to each other, the transmission portions of the inner housing shell acting as bridging driver members to cause flexure of the outer flextensional housing shell. Preferably the outer housing shell similarly comprises a pair of contact portions and, located between the said pair of contact portions, a pair of transmission portions, the bridging driver members contacting the contact portions of the outer housing shell such that, in operation, the movement of the bridging driver members moves the contact portions of the outer housing shell relative to each other, causing the outer housing shell to flex and a consequent movement of the transmission portions of the outer housing shell relative to each other. Preferably the bridging members extend along a common axis. In preferred embodiments the relative movement of the transmission portions of the outer housing shell is amplified compared with the relative movement of the transmission portions of the inner housing shell, which is amplified compared to the change in length of the inner driver member. Preferably the amplification of displacement achieved and passed on by each housing shell is at least ×2, more preferably at least ×3, especially preferably at least ×4, or even ×5.

The second category of transducers according to the invention is sensors. In this case, in operation, a movement (e.g. a sonar wave) to be detected causes an input flexure of the outer housing shell, e.g. by exerting a force on transmission portions of the outer housing shell. This causes shell flexure and a consequent relative movement of the contact portions of the outer housing shell which movement is transferred via the bridging driver members to cause a consequent relative movement of the contact members of the inner housing shell resulting in a change in length of the inner driver member, which can be detected in a known manner. For example the inner driver member may comprise a piezoelectric material. When this material is strained a potential difference is generated across the material which is proportional to the strain. When acting in this mode the nested housing shells typically amplify the force that is transmitted through the transducer, with a corresponding reduction in the displacement transmitted. Preferably the amplification of force achieved is achieved and passed on by each housing shell is at least ×2, more preferably at least ×3, especially preferably at least ×4, or even ×5.

When we say the contact portions of the outer housing shell are driven by the transmission portions of the inner housing shell this includes the contact portions of the outer housing shell and the transmission portions of the inner housing being discrete contacting parts, or being integrally formed as one part. The key feature is that there is linked movement, that is movement of the transmission members of the inner housing shell causes movement of the contact portions of the outer shell (in actuator mode), or vice versa (in sensor mode), so that the transmission portions of the inner shell are acting as bridging driver members between the inner and outer housing shells. Alternatively, if the shells are constrained so they can not move, an input force on the inner shell (in actuator mode), or on the outer shell (In sensor mode), is transmitted, in a similar manner to above, instead of displacement.

In preferred actuator embodiments according to the invention, the elongate driver member of the inner housing shell is actuated by a signal (typically an electrical signal) so as to change its length, and the inner flextensional housing shell comprises transmission portions located between the said contact portions on opposite sides of the housing shell, the arrangement being such that the said change in length of the driver member causes the said transmission members of the inner housing to move relative to each other, or to exert a force, in a different direction, preferably an orthogonal direction, to the inner driver axis. This displacement or force is then translated, and typically amplified, through the mechanical linkage of the nested flextensional housing shells, into an output displacement or force of the outer shell in a different direction. In some preferred embodiments the direction of the output displacement or force is orthogonal to the inner driver axis; in other preferred embodiments the direction is coincident with the inner driver axis; in other embodiments it is at an angle between zero and 90° to the inner driver axis.

In preferred transducers according to the invention the inner housing shell comprises orthogonally disposed primary and secondary shell axes, and the said inner driver member axis is coincident with the primary axis of the inner housing shell, and the said bridging driver members lie along a common axis that is coincident with the said secondary axis of the inner housing shell. Generally, in these cases, actuating the inner driver member causes the contact portions of the inner shell to move relative to each other along the Inner driver axis causing the inner shell to flex to produce complementary shell motion in the direction of its secondary axis. Preferably the outer housing shell also comprises orthogonally disposed primary and secondary axes. The primary and secondary axes of each housing shell may be the major and minor axes respectively. The transmission portions of the inner housing shell, which also provide the bridging members between the shells, preferably extend as blocks laterally of the inner shell and the inner driver, extending to the contact portions of the outer shell. When talking about the "minor axis" of the inner shell these extending-transmission members are not considered to be contributing to the length of the "minor axis" of the inner shell since they project from the containing surface of the shell.

In some embodiments the outer housing shell also comprises orthogonally disposed primary and secondary axes. In these embodiments the primary axis of the outer shell is preferably coincident with the secondary axis of the inner shell, and the secondary axis of the outer shell may be in a direction that is orthogonal to both the primary and secondary axes of the inner shell. In some other embodiments in which the outer housing shell also comprises orthogonally disposed primary and secondary axes, the primary axis of the outer shell is again preferably coincident with the secondary axis of the inner shell, but the secondary axis of the outer shell is coincident with the primary axis of the inner shell.

The present invention also provides a flextensional transducer capable of acting as an actuator or sensor and comprising at least one inner elongate driver member contained within, and mechanically coupled to an inner flextensional housing shell that is itself nested within, and mechanically coupled via opposing bridging members located on the inner shell, to an outer flextensional housing shell, whereby; when acting as an actuator, an input displacement, or applied force, generated by the inner driver member in a first direction along its axis generates via flexure of the inner shell a related displacement/force in a second, orthogonal direction in the opposing bridging members that couple the shells together, which bridging members act as driver members for the outer housing shell and thereby generate, via flexure of the outer shell, a related displacement/force in opposing output members located on the outer shell in a third direction; and, when acting as a sensor, an input displacement or applied force generated by a relative displacement or force between opposing members of the outer shell in the said third direction, generates via flexure of the outer shell, a related displacement/force in the said second direction in the bridging members that couple the shell together, which bridging members act on the inner housing shell to generate via flexure of the inner shell a related displacement/force, between opposing portions of the inner shell which contact opposite ends of the at least one elongate driver member, in the direction of the inner driver member, wherein the elongate driver is subjected to a strain or force and can generate a signal in response to that strain or force; the said third direction being either orthogonal to the first and second directions or parallel with the first direction.

Certain preferred embodiments of the invention can be classed "XYZ" transducers where X, Y and Z are the names of orthogonal axes according to conventional notation. XYZ transducers are those in which an input displacement (or force) in the X direction is translated by an intermediate displacement (or force) in the Y direction to an output displacement (or force) in the Z direction by the nested shell configuration. For example, where both the inner and outer housing shells comprise primary and secondary shell axes, and (i) the primary axis of the inner shell lies along the inner driver axis, which we shall call the X direction, (ii) the secondary axis of the inner shell and the primary axis of the outer shell lie in an orthogonal direction which we shall call the Y direction, and (iii) the secondary axis of the outer shell is in a direction that is orthogonal to both the primary and secondary axes of the inner shell, in a direction which we shall call the Z direction, then an input displacement along the primary axis of the inner shell (X direction) caused by a change in length of the inner driver member, is translated by flexure of the inner shell into a related displacement along the secondary axis (Y direction) of the inner shell, which is in turn translated, by flexure of the outer shell, into a related displacement along the secondary axis of the outer shell (the Z direction).

Other preferred embodiments of the invention can be classed "XYX" transducers where X and Y are the names of orthogonal axes according to conventional notation. XYX transducers are those in which an input displacement (or force) in the X direction is translated by an intermediate displacement (or force) in the Y direction to an output displacement (or force) in the original X direction, by the nested shell arrangement. For example, where both the inner and outer housing shells comprise primary and secondary shell axes, and the primary axis of the inner shell lies along the inner driver axis, which we shall call the X direction, and the secondary axis of the inner shell and the primary axis of the outer shell lie in an orthogonal direction which we shall call the Y direction, and the secondary axis of the outer shell extends in the X direction, then an input displacement along the primary axis of the inner shell (X direction) caused by a change in length of the inner driver member, is translated by flexure of the inner shell into a related displacement along the secondary axis (Y direction) of the inner shell, which is in turn translated, by flexure of the outer shell, into a related displacement along the secondary axis of the outer shell (in this case, the X direction).

As can be seen, different input/output directions can be achieved by appropriate relative orientation of the nested housing shells. If XYX transducers can be considered to translate the direction of the input displacement or force by 0 degrees, and XYZ transducers can be considered to translate the direction of the input displacement or force by 90 degrees. Other relative orientations of the housing shells to achieve translations of the displacement or force by angles between zero and 90 degrees are also envisaged.

A second aspect of the invention provides a flextensional transducer comprising at least one inner elongate driver member contained within, and mechanically coupled to an inner flextensional housing shell that is itself nested within an outer flextensional housing shell, the inner elongate driver member and both flextensional housing shells lying in a common surface, and the inner and outer flextensional housing shells being mechanically coupled to each other by a bridging member, whereby an input displacement of, or applied force on, one of the said flextensional housing shells in the direction of the inner elongate driver member is translated, via flexing of the flextensional transducers and the bridging member, into a respective amplified displacement of, or force on, the other of the said flextensional housing shells, in the direction of the inner elongate driver member.

Thus this nested arrangement of flextensional housing shells according to the second aspect of the invention allows an initial input displacement or force in one direction to generate an output displacement or force, in the same direction, that is amplified in size. Since a single flextensional housing shell can, and usually is, arranged to amplify its input displacement or force, the nesting of the flextensional housing shells which itself amplifies the displacement or force as it passes from one housing shell to the next means that the arrangement of the invention can provide an even further amplified displacement or force.

The invention also provides a flextensional transducer capable of acting as an actuator or sensor and comprising at least one inner elongate driver member contained within, and mechanically coupled to an inner flextensional housing shell that is itself nested within, and mechanically coupled via opposing bridges to an outer flextensional housing shell such that, in actuator mode, the opposing bridges transmit the output force/displacement from the inner shell as an input force/displacement into the outer shell, wherein the inner elongate driver member and both flextensional housing shells lie in a common surface, wherein, in actuator mode, each shell has a driver axis along which the input force/displacement acts and an orthogonal transmission axis along which that shell generates a related output force/displacement, whereby the transmission axis of each shell is coincident with the driver axis of the respective other shell such that, in actuator mode, an input force/displacement generated by the inner elongate driver member along the driver axis of the inner shell results in an output force/displacement being transmitted in the same direction along the transmission axis of the outer shell.

Preferably the inner flextensional housing shell, of embodiments according to the second aspect of the invention, comprises contact portions and transmission portions, the contact portions contacting opposite ends of the inner elongate driver member, and the transmission portions of the inner flextensional housing shell providing the bridging members between the inner and outer flextensional housing shells. Preferably the inner flextensional housing shell comprises orthogonally disposed primary and secondary axes, the inner driver member and the contact portions of the inner flextensional housing shell lying along the said primary axis, and the transmission members of the inner flextensional housing shell lying along the said secondary axis, on opposite sides of the inner elongate driver member. Preferably the outer flextensional housing shell also comprises orthogonally disposed primary and secondary axes, and the outer flextensional housing shell also comprises contact portions and transmission portions, the contact portions and transmission portions of the outer flextensional housing shell lying along the primary and secondary axes respectively of the outer flextensional housing shell, wherein the transmission portions of the inner flextensional housing shell are mechanically coupled to the contact portions of the outer flextensional housing shell, and wherein the primary axis of the inner flextensional housing shell is coincident with the secondary axis of the outer flextensional housing shell and vice versa; i.e. the secondary axis of the inner housing shell is coincident with the primary axis of the outer flextensional housing shell. The primary and secondary axes of these embodiments may be the major and minor axes.

A preferred flextensional transducer according to this second aspect of the present invention is an actuator, wherein in operation the inner elongate driver member is activated to cause it, if unconstrained, to change in length (usually to increase in length), which since the inner elongate driver member is mechanically coupled to the inner flextensional housing shell, provides the input displacement of the contact portions of the inner flextensional housing shell, or if the transducer is constrained the input applied force on the inner flextensional housing shell, in the direction of the inner elongate driver member. The inner flextensional housing shell flexes and exerts a displacement (or force) via the bridging members onto the outer flextensional housing shell in a direction that is orthogonal to the direction of the inner elongate driver member. The outer flextensional housing shell, in turn, flexes to exert an output displacement (or force) that is in the direction of the inner elongate driver member, i.e. in the same direction as the input displacement. Where the transducer is operating as a sensor, the input displacement is received by the outer shell and movement is reversed. In both cases the transmission members of the inner shell are acting as the bridges linking the movement between the two shells.

Thus in the case of the transducer operating as an actuator when the initial input displacement is generated by a change in length (usually an increase in length) of the driver, the contact portions of the inner flextensional shell are displaced along the axis of the driver. This causes the inner housing shell to flex causing the transmission portions to be displaced in a different direction. These transmission portions then act as a driver to move the contact portions of the second housing shell relative to each other. This causes the outer housing shell to flex, and the transmission portions of the outer housing shell to be similarly displaced, this time in the driver direction, i.e. in the same direction as the input displacement. Where the transducer is operating as a sensor, the input displacement is received by the outer shell, and movement is reversed. In both case the transmission member of the inner shell is acting as the bridge linking the movement between the two shells.

According to some aspects of the invention it is a preferred feature, and according to other aspects a required feature that each flextensional housing shell amplifies its input displacement (or force). Thus, for these cases, the movement of the flexing limbs of the inner flextensional housing shell is amplified relative to the change in length of the driver, and similarly the displacement of the outer flextensional housing shell is amplified relative to the displacement of the inner flextensional housing shell. Typically the inner flextensional housing shell gives an amplified displacement that is about 5 times that of the change in length of the inner driver. Similarly the outer flextensional shell gives its own output displacement that is about 5 times its input displacement (which for the outer shell is provided by the output displacement of the inner shell). Thus the total amplified displacement for the nested shells may be squared in value, in this case $5^2$ or 25.

The transducer according all aspects of the invention may advantageously be used to displace or to apply a force to a device. It will be appreciated that in applications where the transmission portions are unrestricted by other members, they will usually transmit a displacement, but in other applications, if the transducer movement is constrained, they will usually exert a force rather than a displacement to a device.

When the transducers according to the invention are acting as actuators, the output displacement or force of the outer housing shell (e.g. the relative displacement of the transmission portions of the outer housing shell) is preferably amplified compared with the relative output displacement or force of the inner housing shell (e.g. the relative displacement of the transmission portions of the inner housing shell), which is itself preferably amplified compared to the input displacement or force of the inner driver member (e.g. the change in length of the inner driver member). Typically an amplification of times five can be achieved with each housing shell, so for a double nested housing shell arrangement the optimum amplification is squared, e.g. for a typical arrangement this would be five squared or 25.

The flextensional housings of the actuator type transducers according to all aspects of the invention may be designed in a known manner to provide so called "push" actuators, exerting an outward displacement or force in operation, or so called "pull" actuators exerting an inward displacement or force in operation.

Preferably the inner and/or outer housing shells comprise closed loops. The shells preferably flex in a "scissor lift" type mode to transmit displacement or force in one direction to an amplified displacement or force in another directions, preferably in a transverse or more preferably in an orthogonal direction. Preferably the inner housing shell is nested within the outer housing shell. For preferred embodiments of transducers according to all aspects of the invention where the inner housing shell comprises contact portions and transmission portions, these transmission portions are preferably located on opposite sides of the housing and the driver, preferably between, especially mid-way between the contact portions. Flexure of such an arrangement in "scissor lift" mode generally provides a displacement of, or force on, the transmission portions relative to each other in an orthogonal direction which is both away from the inner driver axis, and along a common axis. It is also envisaged that the transmission portions could be spaced in a non-mid position, i.e. closer to one contact portion than the other on one side (not end) of the driver, and in an unrelated position at the other side of the driver. This would generally provides a displacement of, or force on, each of the transmission portions in an orthogonal direction away from the inner driver axis, but along axes that are off-set relative to one another.

In preferred embodiments of the first and second aspect of the invention, the inner driver member, the inner housing shell and the bridging driver member lie in a common surface. In some embodiments this common surface is a first flat plane. In some embodiments the inner and outer housing shells lie in separate flat planes which are orthogonally disposed planes. The aforementioned XYZ transducers are examples of this type of embodiment.

In other embodiments the inner and outer housing shells each lie in the same common flat plane. The aforementioned XYX transducers are examples of this type of embodiment.

In other embodiments the inner and outer housing shells each lie in separate substantially flat planes, which are inclined at an angle to each other. This angle may be between zero and 90 degrees.

As noted above, the transmission portions of the inner housing shell preferably extend as blocks laterally from the surface of the inner shell to provide the bridging portions between the shells. These blocks preferably extend in the plane of the outer housing shell where that is planar.

In other embodiments common surface is a curved surface, and the inner and outer housing shells are disposed in the common curved surface. Where this is the case, the curved surface is preferably shaped as at least part of a curved cylindrical surface. In this event the inner driver member preferably extends on the curved surface in a direction that is substantially parallel to the cylinder axis. The radius of curvature of such a curved surface is preferably at least as large as any actual dimension of the transducer.

In some embodiments according to the invention, two or more inner driver members extending parallel to each other within the inner flextensional housing shell are provided, the contact portions of the inner housing shell contacting opposite ends of each of the inner driver members. The use of such multiple driver members increases the force exerted by the driver. In other embodiments according to the invention two or more "inner housing shells" may be arranged (preferably parallel to each other) within a common outer housing shell. These then act in parallel on the outer housing shell to drive the outer housing shell. The use of such multiple "inner housing shells" similarly increases the force exerted.

It is also envisaged according to the invention to use more than two housing shells, preferably nested sequentially one within the other. For example, in one embodiment according to the invention the transducer comprises a third housing shell, which we shall term the outermost housing shell, surrounding the said outer flextensional housing. The outer housing shell and outermost flextensional housing shell are preferably in mechanical contact with each other so that on actuation flexure of the outer flextensional housing causes flexure of the outermost flextensional housing shell, or vice versa. Preferably the outermost flextensional housing shell comprises contact portions and transmission portions in corresponding positions to those in enclosed nested shells, the transmission portions of the outer housing shell acting as a driver between the outer and outermost housing shells. As would be apparent to the man skilled in the art, any number of nested shells could be used, the only restrictions being the size of the overall transducer and the ability of the driving force or displacement to transmit through the nested shells. In such multiple nested shell arrangements, the terms "inner housing" and "outer housing" shell refer to the inner and outer of any two adjacent shells in the nested arrangement.

In such multi-shell arrangement any suitable relatively orthogonal relationship is possible in the direction of displacement/force translated via adjacent housing shells. Thus using the nomenclature referred to above, transducers may be XYZX, or XYZY, or XYZXYX, or any combination including a direction that is orthogonal to X or Y but at an angle to the XY plane.

One embodiment according to the second aspect of the invention is a multi-shell arrangement that comprises three or more nested flextensional housing shells each housing shell lying in the said common surface and comprising primary and secondary axes, and each housing shell comprising a pair of contact portions on opposite sides of the housing along its primary axis and a pair of transmission portions on opposite sides of the housing along its secondary axis, the transmission portions of each nested shell acting as the bridging member between adjacent nested shells. Generally, in these embodiments, where there is an odd number of nested housing shells, the input displacement (or force) will be translated and amplified by any two adjacent shells to a displacement (or force) in the same direction as the input displacement, but the final output displacement will be in the orthogonal direction to the input displacement (or force), within the common surface of the housing shell. Thus, for example, for a three nested shell actuator, if an input displacement is in the X direction, the inner shell translates this to an amplified displacement in the Y direction, the adjacent shell translates this to an amplified displacement in the X direction, and the outermost shell translates this to an amplified displacement in the Y direction, i.e. orthogonal to the input displacement.

The inner and/or outer housing shells preferably comprise shoulder portions that are flexibly connected between the contact portions and the transmission portions, preferably by flexible hinges such as pin hinges, or by flexure hinges, that is regions of the housing that are in the form of flexible straps of smaller cross-sectional area than adjacent regions of the housing shell. The shoulder regions are preferably stiffer than the flexible connection region, the shell flexure being accommodated by movement of the shoulder portions relative to the contact portions and transmission portions about these flexible regions.

The inner driver member is preferably one which can be activated to change its length when subjected to an electrical signal, and/or which in reverse operation generates an electrical signal in response to a change in its length. Suitable candidates for materials for the driver member include socalled "smart materials", these being materials that can have one or more properties altered in a controlled manner by an external stimulus such as an electric or magnetic field or temperature. Examples of suitable smart materials include piezoelectric materials shape memory alloys, magnetic shape memory alloys, magnetostrictive materials and electrostrictive materials.

Piezoelectric materials are materials that undergo a small dimensional change in response and proportional to the strength of an applied voltage, or in reverse operation, generate a voltage in response to an applied mechanical stress. These materials may recover their original shape when the voltage is removed. The most common example of piezoelectric material that is used is lead zirconium titanate ($Pb[Zr_x T_{1-x}]O_3$, where $0<x<1$. It is often referred to as a PZT material, this being an abbreviation of its chemical formula A shape memory alloy (SMA) is an alloy that can "remember" its shape, i.e. it can undergo an apparent plastic deformation at a lower temperature that can be recovered on heating to a higher temperature. This shape memory effect is associated with a special group of alloys that undergo a crystal structure change on changing the temperature. The higher and lower temperature phases are termed the austenite and martensite phases respectively. Shape recovery is usually brought about by deforming the alloy in its martensitic phase and then increasing the temperature above the martensite/austenite transition temperature. The shape change can often be reversed by lowering the temperature again, depending on the alloy selection. The most commonly used shape memory alloys are nickel/titanium alloys. Thus, an actuator with an SMA driver member may switch between two displacements, whereas a PZT driver member can undergo a variable dimensional change, depending upon the applied voltage.

A magnetic shape memory alloy (MSMA) is a more recently developed SMA and is one that changes its shape in response to the magnetic field. An example of such a MSMA material is an alloy of nickel, manganese and gallium.

A magnetostrictive material is a material that changes its shape when subjected to a magnetic field, and can recover its original shape when the magnetic field is removed. The most commonly used magnetostrictive alloy is Terfenol-D, an alloy of terbium and iron.

An electrostrictive material is a material that changes its shape when subjected to an electric field and can recover its original shape when the electric field is removed, or which in reverse operation, generates an electric field in response to a change in its shape. The most common electrostrictive material is a lead magnesium-niobate (PMN) ceramic material.

The use of smart materials for the driver is advantageous for a number of reasons. The materials are actuated by an external stimulus, often remotely, making it suitable for applications where access is difficult. Also devices incorporating smart materials are usually more compact, robust, and reliable, have high output forces and require less maintenance than more conventional technologies. When choosing between smart materials, one consideration is that SMAs are particularly advantageous where relatively large displacements, with high farce are desired. Another consideration is that piezoelectric materials allow a variable displacement to be achieved according to the voltage applied.

A preferred embodiment of the invention provides a transducer that can be stored at room temperature and activated and operated at an elevated temperature in excess of 200° C., even at a temperature in excess of 300° C., 400° C., 500° C., or even 570° C. In this embodiment the said bridging driver member between the said inner and outer flextensional housing shells comprises a material having a different coefficient of thermal expansion from that of adjacent parts of the said inner and outer flextensional housing shells, and acts not only as a bridging member but also as thermal compensating member. Preferably the said bridging driver member comprises a material having a higher coefficient of thermal expansion than the adjacent parts of the said inner and outer flextensional housing shells so that it expands more than the adjacent parts of the inner and outer housing shells as the temperature increases up to and at the elevated temperature, causing the inner housing shell to flex so as to urge the contact portions of the inner housing shell towards each other to compensate for the greater thermal expansion of the inner housing shell relative to that of the inner driver member at any given temperature up to the elevated temperature. Thus the bridging thermal compensating member acts to flex the inner housing shell at elevated temperatures (in the absence of actuation of the driver) to maintain mechanical contact between the inner driver member and the contact portions of the inner housing shell. By "mechanical contact" we mean that there is sufficient contact to secure the elongate driver within the housing.

In general it is preferred that there are no separate retaining means, such as screws or the like, to secure the elongate driver member within the housing. Where such separate retaining means such as screws are present, special care, and/or even special interface members, may be needed, in order to ensure a secure and aligned contact is achieved at the driver element/screw tip interface. The mechanical contact must be sufficient to withstand extraneous forces such as gravity or vibration acting on the transducer in operation.

The use of thermal compensating portions as bridging members between nested flextensional housing shells to maintain mechanical contact between the inner housing shell and the driver member over a wide range of temperatures is considered highly innovative. The skilled person would be able to select suitable materials having different coefficients of thermal expansion that would be suitable as bridging members from his common general skill and knowledge.

Transducers according to the invention can advantageously provide reliable, compact, robust, electrically activatable devices generating displacement or force for use as actuators or sensors in a number of fields.

Specific typical applications of the transducers include fluid pumps, where a desired quantity of fluid is required over a time period, e.g. in the medical industry to deliver fluid to a patient, or in fuel injection systems, e.g. in the aerospace or other vehicle industries. Other possible applications include flight control actuators, including rotor blade and wing-flap control mechanisms. For the above applications transducers incorporating a smart material as the inner driver are preferred. Preferred embodiments for these applications include a piezoelectric material for the inner driver of the inner housing shell.

Other preferred applications for transducers according to the present invention, especially transducers according to the second aspect of the invention, or other transducers in which the inner and outer housing shells are in a common surface, especially a curved surface, include the actuation of downhole valves or other downhole devices. For these applications the transducers preferably incorporate a smart material, especially preferably a shape memory alloy, as the driver member. This alloy advantageously generates a high force and sufficient displacement to overcome blockages and scale that can build up in the valve mechanism, or other downhole application, over a period of time. Shape memory alloy driver members are also advantageous for such downhole uses since they are robust with high output forces and have no moving parts that could otherwise be damaged during installation or during the lifetime of the valve.

In preferred transducers according to the second aspect of the invention the common surface in which the driver and housing shells lie is curved. For certain applications it is preferred for a number of such transducers to be incorporated into a flextensional transducer module that is substantially cylindrical.

Another aspect of the present invention provides a flextensional transducer module that is substantially cylindrical and comprises two or more transducers according to the invention, which transducers are functioning as actuators, and the inner and outer housing shells of which lie in a common surface that is a cylindrical curved surface, the transducers being arranged circumferentially relative to each other around the said curved cylindrical surface, and the inner driver members of each transducer extending in the said cylindrical surface substantially parallel to the cylinder axis, and the transducer module additionally comprising two annular rings that define circumferences of the said cylinder surface, the annular rings being positioned at opposite axial sides of the transducers and being axially displaceable relative to each other by flexure of the outer shell of the said transducers. Preferably the transducers are transducers according to the second aspect of the invention or other transducer according to the invention where the outer shell comprises transmission members, and the annular rings of the module are preferably mechanically coupled to the transmission portions of each of the outer shells of each of the transducers.

A downhole apparatus comprising a substantially cylindrical module of this nature with any flextensional actuator separating the annular rings is novel per se.

A further aspect of the invention provides a substantially cylindrical module, which is preferably a downhole apparatus, comprising first and second annular rings defining the end circumferences of the module and two or more flextensional actuators arranged in the curved surface that defines the cylindrical surface of the module, the actuators being circumferentially spaced relative to each other, and each being separately connected to each of the annular rings and actuatable to change the axial separation of the annular rings.

Each flextensional actuator comprises an actuatable inner elongate driver member and a flextensional housing shell that is in mechanical contact with and driven by the actuated driver member, and when so driven flexes to change the direction of, and preferably also to amplify, the input displacement or force from the actuated driver member. Generally the driver member is actuatable so as to change its length, preferably increase in length, to generate the input displacement or force for the flextensional housing.

In modules according to the invention, each annular ring is preferably in a plane that is orthogonal to the cylinder axis. Such a flextensional transducer module may advantageously be used as an actuator to displace a device relative to an elongate cylindrical substrate such as a pipe. It finds particular application for displacing devices in or on a downhole pipe, or moving itself relative to a downhole pipe.

The actuators that are included in the above modules of the invention are preferably transducers according to the invention, preferably those comprising nested housing shells that lie in a common curved plane, but any suitable flextensional actuator that can increase its dimension in the axial direction of the module could also be used. Preferably the actuators are electrically actuatable, and preferably comprise smart materials.

In operation, one annular ring of such a module is preferably retractably fixed to a substantially cylindrical substrate, for example a pipe such as a downhole pipe. Any suitable trapping or locking device can be used to do this. Then, on activation of the transducers in the module, the module increases in length, and the other ring is moved axially relative to the substrate. Once moved, this other ring may similarly be retractably fixed to the pipe, the first ring released from the substrate and the module allowed to recover its length. Thus the module is made to move axially along the substrate, in the manner of a so-called "inch worm". The process can be repeated for further movement along the substrate, or reversed to return to the original position. Such a movement may be used to operate a downhole device, e.g. to open or close a valve.

A preferred module according to the invention of the type described above that can advantageously operate in the above described manner comprises a plurality of retractable gripping members arranged around a surface of at least one of the said annular rings, which gripping members can be retracted, in use, to release a substrate, and projected to grip the said substrate.

Another aspect of the invention provides a substantially cylindrical module comprising first and second annular rings defining the end circumferences of the module, a plurality of retractable gripping members arranged around a surface of at least one of the said annular rings, which gripping members can be retracted, in use, to release a substrate, and projected to grip the said substrate, and two or more actuators arranged in the curved surface that defines the cylindrical surface of the module, the actuators being circumferentially spaced relative to each other, and each being separately connected to each of the annular rings and actuatable to change the axial separation of the annular rings.

The gripping members arranged around a surface of any module according to the present invention are preferably arranged circumferentially around surface of at least one of the annular rings of the module, and preferably circumferentially around a major surface of at least one of the annular rings of the module. By "a major surface" we mean the inwardly facing or the outwardly facing surface of the at least one annular ring, rather than the end surfaces of the annular ring. In a preferred module the gripping members are arranged around the inner surface of at least one of the said annular rings, which gripping members can be retracted, in use, to release a contained cylindrical substrate, and projected to grip the said substrate. In another module the gripping members are arranged around the outer surface of at least one of the said annular rings, which gripping members can be retracted, in use, to release a surrounding cylindrical substrate, and projected to grip the said substrate.

Preferably each gripping member is a ball, and the annular ring includes a wedge shaped surface along which respective balls can move, preferably by rolling or sliding, to grip or release the substrate. In such cases the module preferably additionally comprises an electrically activatable trigger member which is activatable, in use, to move the wedge shaped surface within the module causing the balls to roll along the wedge surface either away from or towards the substrate surface. Movement of the wedge shaped surface within the module is generally also movement of the wedge shaped surface relative to the substrate.

In other preferred embodiments, two or more flextensional transducer modules are incorporated together in an assembly, arranged axially relative to each other in this assembly.

Another aspect of the invention provides a modular assembly comprising two or more substantially cylindrical modules arranged axially relative to each other, and in mechanical contact with each other, each module comprising first and second annular rings defining the end circumferences of the module and two or more actuators arranged in the curved surface that defines the cylindrical surface of the module, the actuators being circumferentially spaced relative to each other, and each being separately connected to each of the annular rings and actuatable to change the axial separation of the annular rings. The cylindrical modules of the assembly may incorporate any of the features described hereinbefore for cylindrical modules of the present invention. Each cylindrical module of the assembly may be arranged to move separately, or to be linked so that movement of one module also moves another module. They may be integrally formed. The modules may be secured to each other or integrally formed, or one may be located so it rests or "piggy backs" on the other to move, but is not secured to it. When modules making up the assembly are integrally formed, they may share a single common connecting annular ring.

The module may be the same or different, so each module may provide the same amount or a different amount of displacement. Thus, when used in combination, the operation of one or more of the two modules can provide a full range of controllable displacement. Thus, for example, when operating to displace a valve member one or more modules can be operated to give the full range of control of the valve, e.g. from fully open, through different partially open states to a fully closed state.

The present invention also provides a method of using a module, or a modular assembly, of the type described above incorporating gripping members on a major surface of one or more of its annular rings, to move along a substrate, the method comprising: (i) projecting the gripping members of one annular ring to grip the substrate while releasing the gripping members at the remote annular ring; (ii) actuating the actuators to increase the axial separation of the annular rings; (iii) projecting the gripping members of the said remote annular ring and releasing the gripping members of the said one annular ring; and (iv) recovering the actuators to their original length.

Another aspect of the present invention provides a method of using a transducer according to the first or second aspect of the invention as an actuator, the method comprising applying a signal to the inner driver member to cause it to change in length which moves the contact portions of the inner housing shell relative to each other causing the inner housing shell to flex causing a consequent movement of the transmission portions of the inner housing shell relative to each other, the transmission portions of the inner housing shell acting as a bridging driver member to cause flexure of the outer flextensional housing shell.

Yet another aspect of the present invention provides a method of using a transducer according to the first or second aspect of the invention as a sensor to detect displacement, comprising locating the outer housing shell adjacent to the displacement to be detected, wherein said displacement to be detected causes flexure of the outer housing shell, which is transmitted through the bridging driver members to cause movement of the transmission portions of the inner shell, flexure of the inner shell, consequent movement of the contact members of the inner shell and a change in length of the driver, the method also comprising monitoring any change in length of the inner driver member using a strain gauge.

The invention further provides a method of using (a) a substantially cylindrical module comprising first and second annular rings defining the end circumferences of the module and two or more actuators arranged in the curved surface that defines the cylindrical surface of the module, the actuators being circumferentially spaced relative to each other, and each being separately connected to each of the annular rings and actuatable to change the axial separation of the annular rings, or (b) any module according to the invention or (c) any modular assembly according to the invention, to move a device axially within a downhole pipe, the method comprising (i) fixing one of said annular rings of the module or modular assembly in the vicinity of the device to be moved, so that the second annular ring is adjacent the device to be moved, and (ii) applying an external stimulus to the inner driver(s) of the module or modular assembly to cause it to change in length, causing a consequent displacement of the second annular ring relative to the pipe, which consequent displacement is an amplified displacement compared with the initial increase in length of the inner driver member(s), the consequent displacement moving the said device axially relative to the downhole pipe.

The invention also provides a method of using (a) a substantially cylindrical module comprising first and second annular rings defining the end circumferences of the module and two or more actuators arranged in the curved surface that defines the cylindrical surface of the module, the actuators being circumferentially spaced relative to each other, and each being separately connected to each of the annular rings and actuatable to change the axial separation of the annular rings, or (b) any module according to the invention or (c) any modular assembly according to the invention, to close a valve opening in a pipe comprising i) fixing one of said annular rings of the module or modular assembly to the pipe so that the remote annular ring is adjacent the valve opening to be closed, and (ii) applying an external stimulus to the inner driver(s) of the module or modular assembly to cause it to change in length, causing a consequent displacement of the second annular ring relative to the pipe, which consequent displacement moves the said remote annular ring to cover the valve opening. The invention similarly provides a similar method to open a valve opening by the above steps, where the initial fixture of the said one annular ring is such that the valve opening is initially covered, and then uncovered when the module changes in length.

Embodiments of the invention will now be described, by way of example, with reference to the accompanying drawings, in which:

FIGS. 16 and 17 are cross-sectional views showing the actuators of FIGS. 3 and 4 operating flaps in a rotor blade and aircraft wing respectively;

Figure 5:
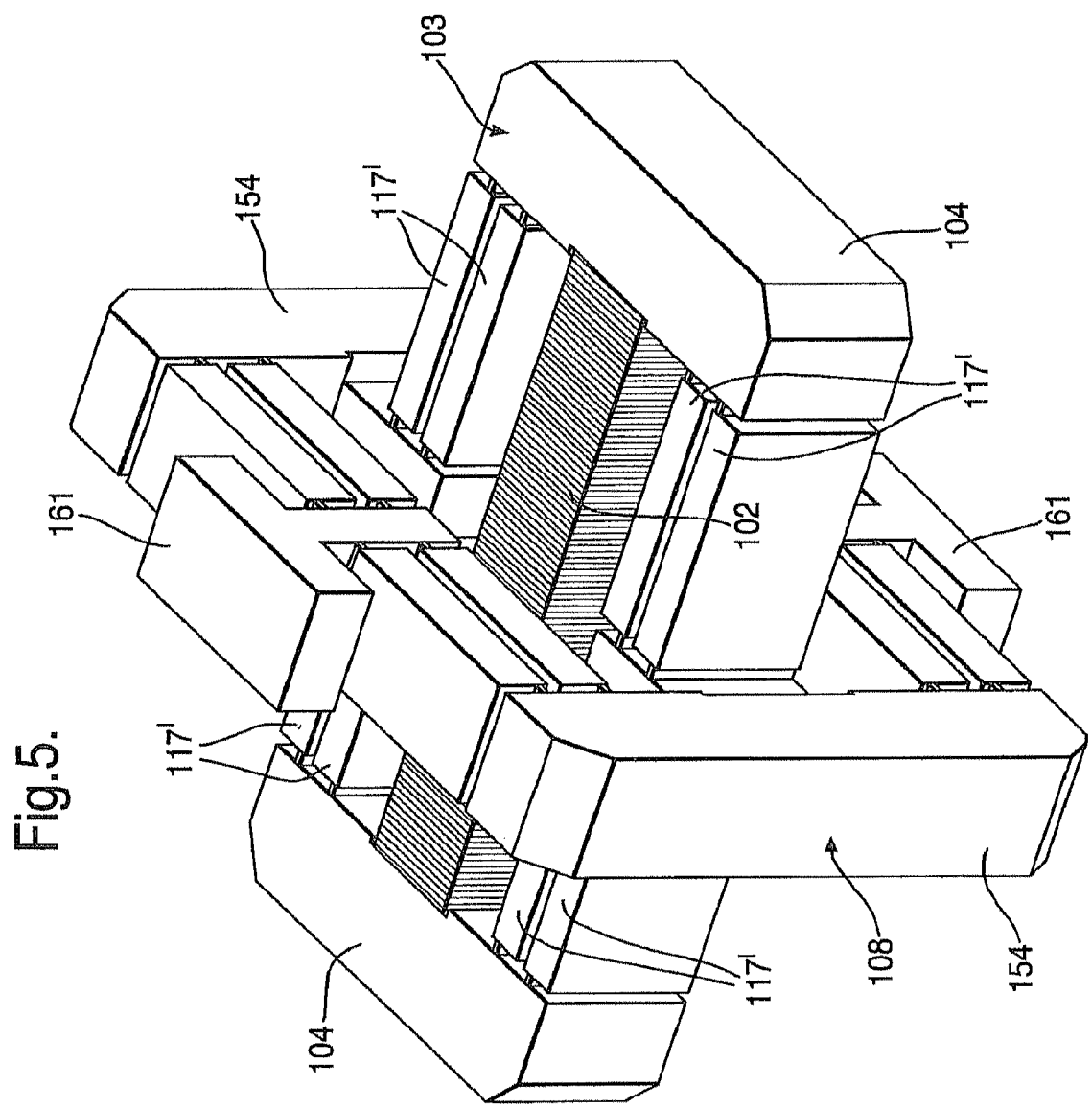
FIGS. 5 and 6 are perspective views of a third transducer according to the invention, respectively before and after actuation of the driver member of the transducer.
Figure 6:
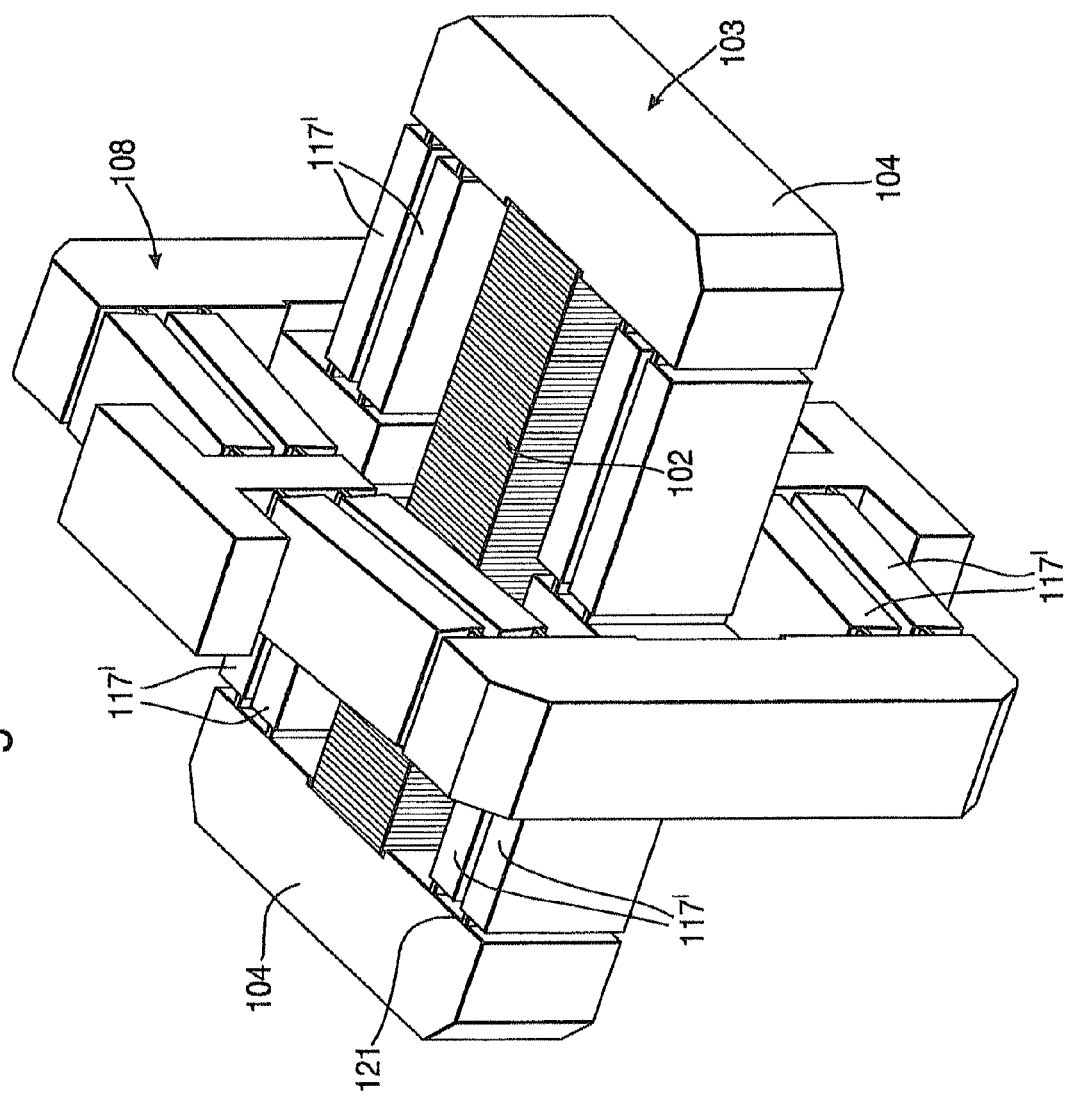
Figure 20:
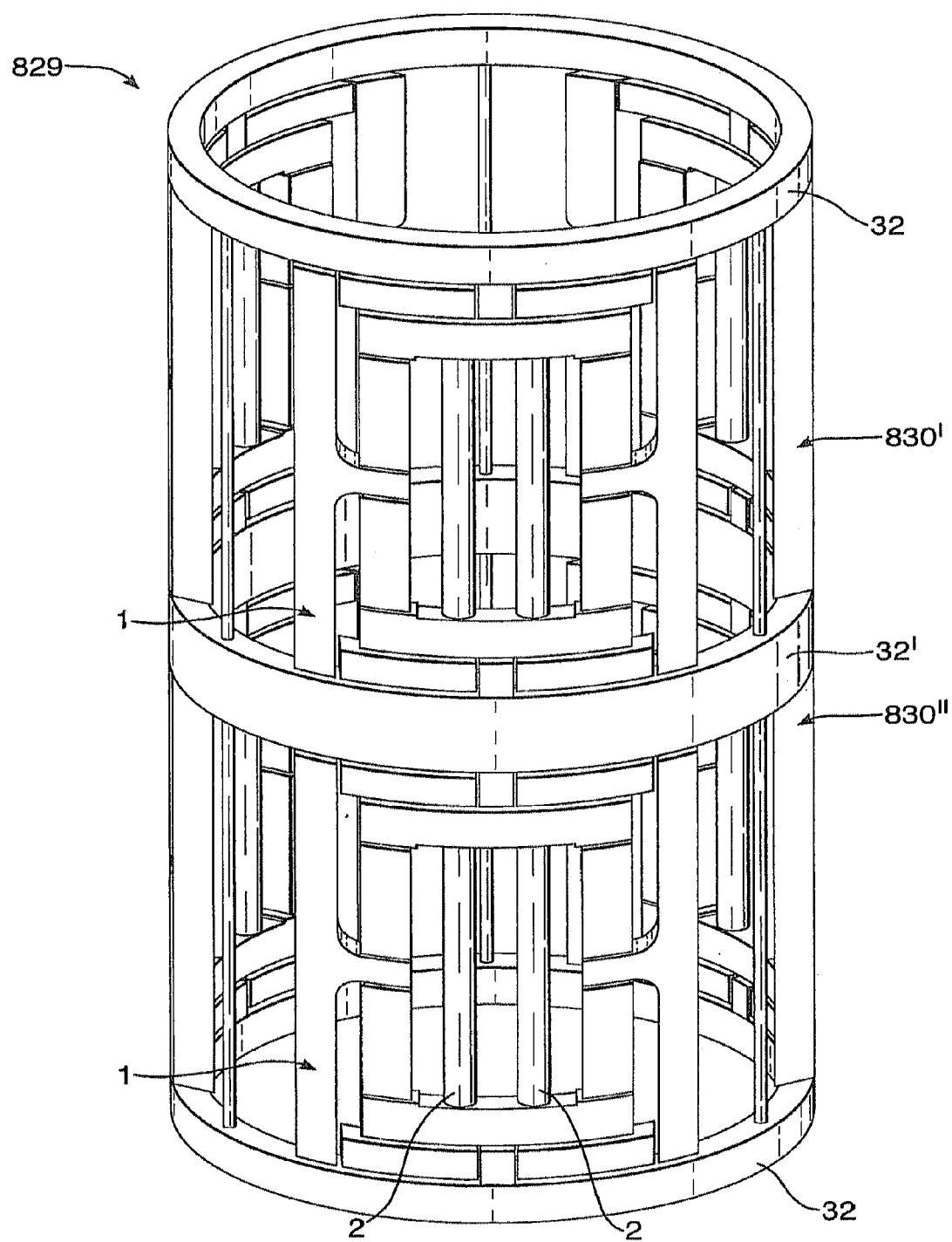
FIG. 20 is a perspective view which shows an arrangement of two cooperating modules of the type shown in FIGS. 19a and 19b.
Figure 24:
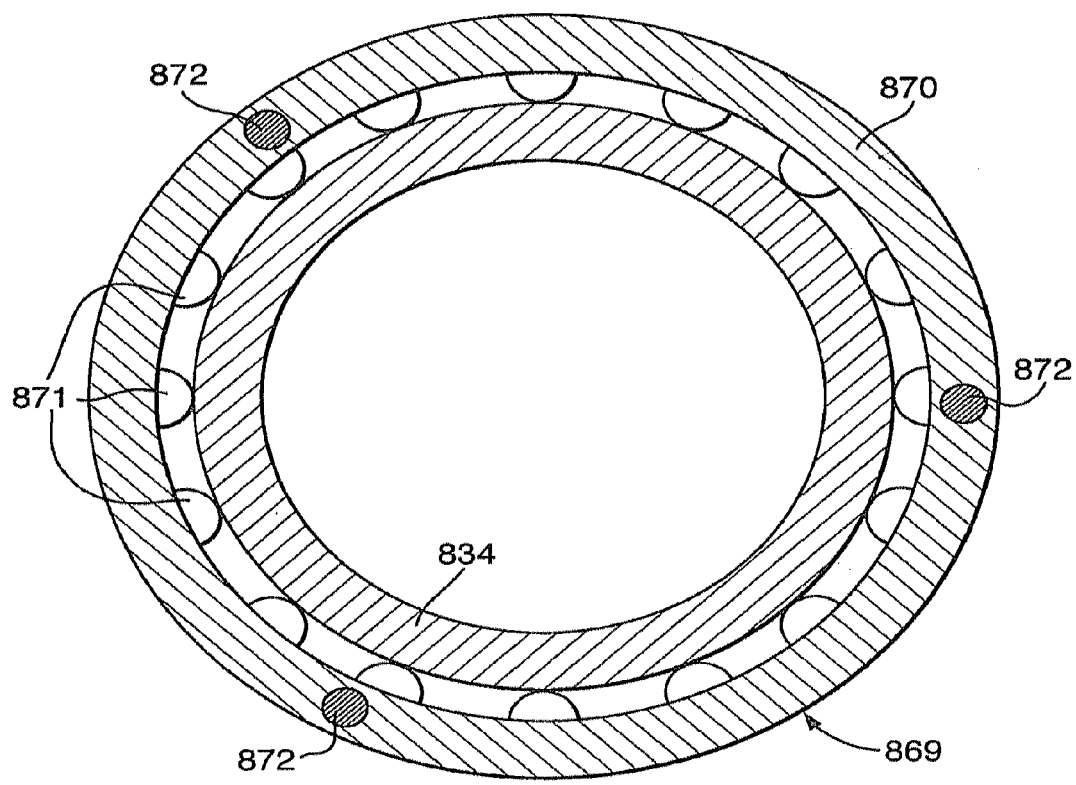
Figure 25A:
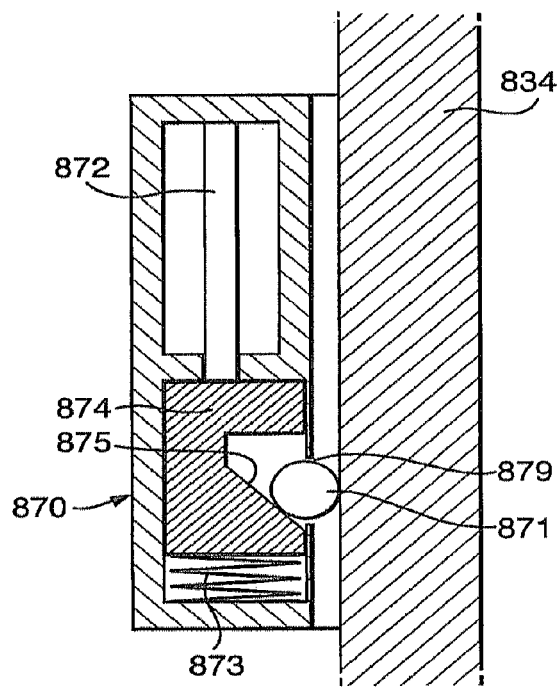
Figure 25B:
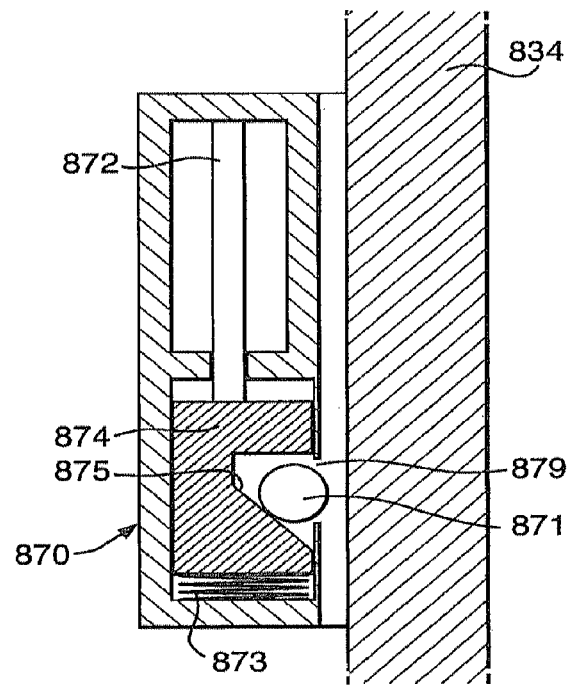
Figure 26:
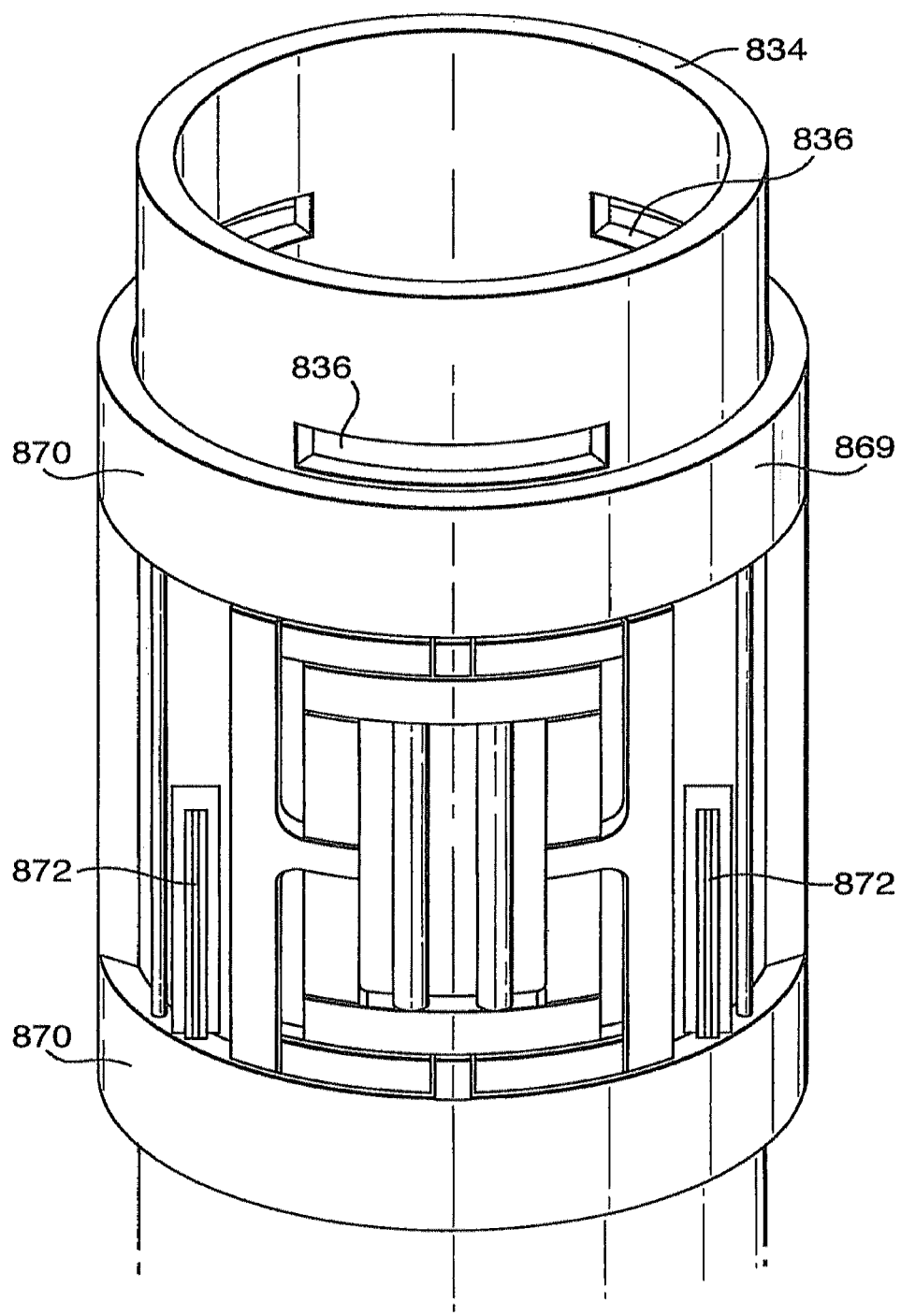
Figure 27A:
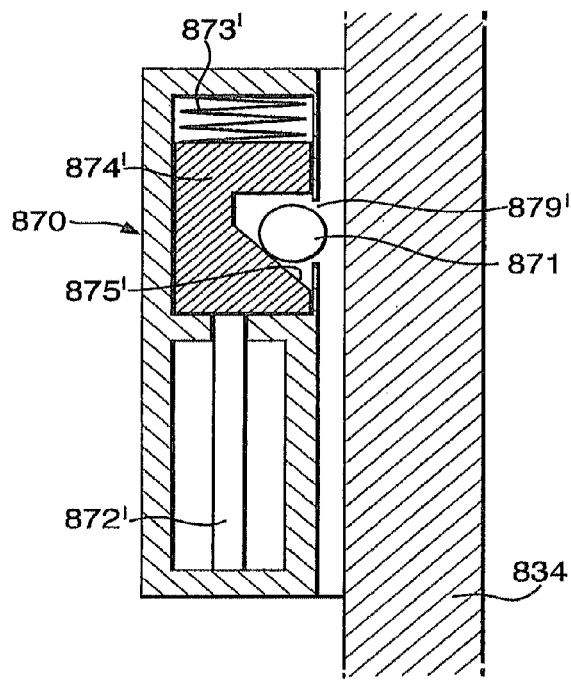
Figure 28:
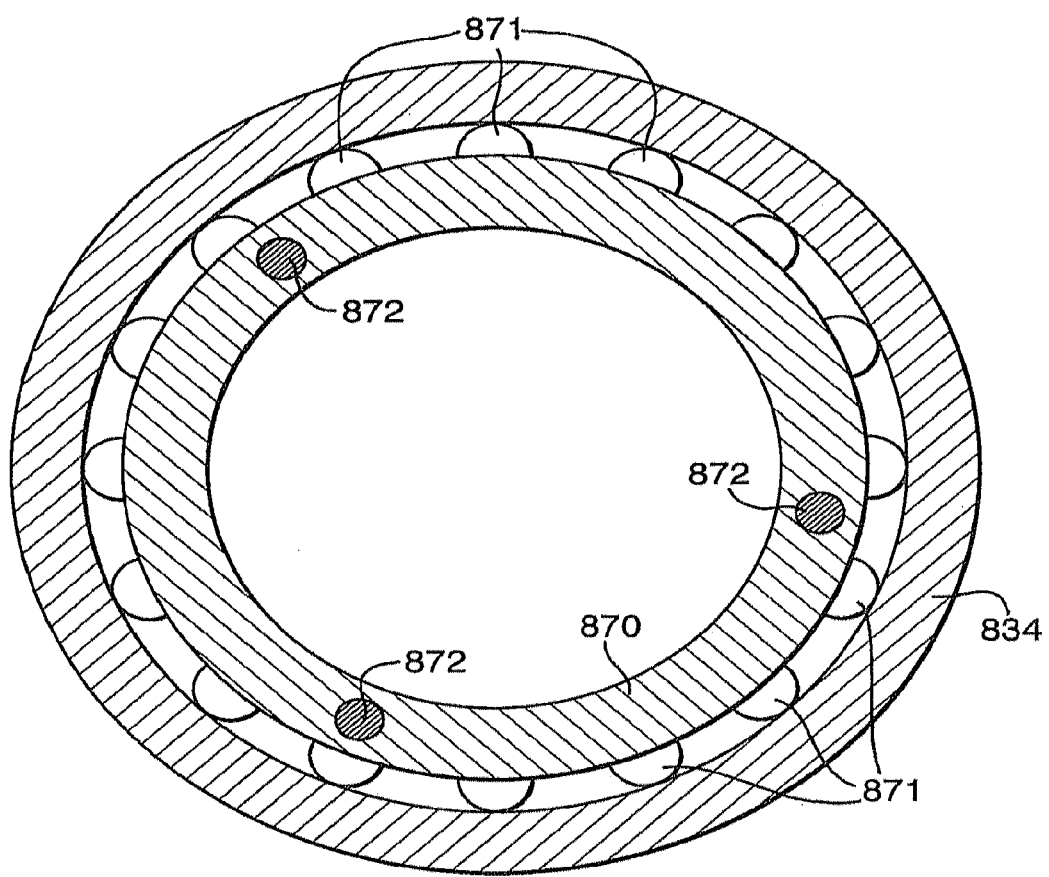
Figure 31:
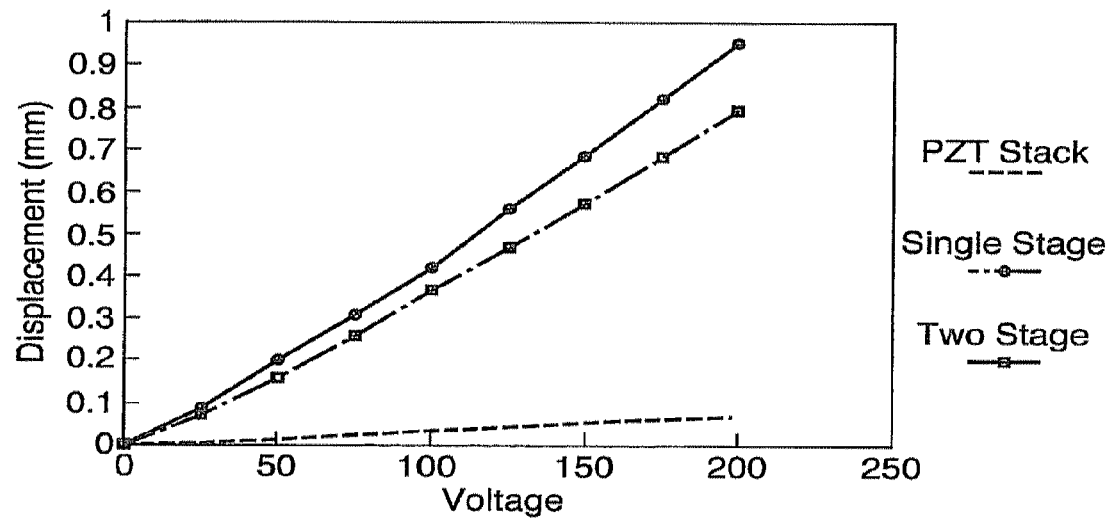
Figure 32:
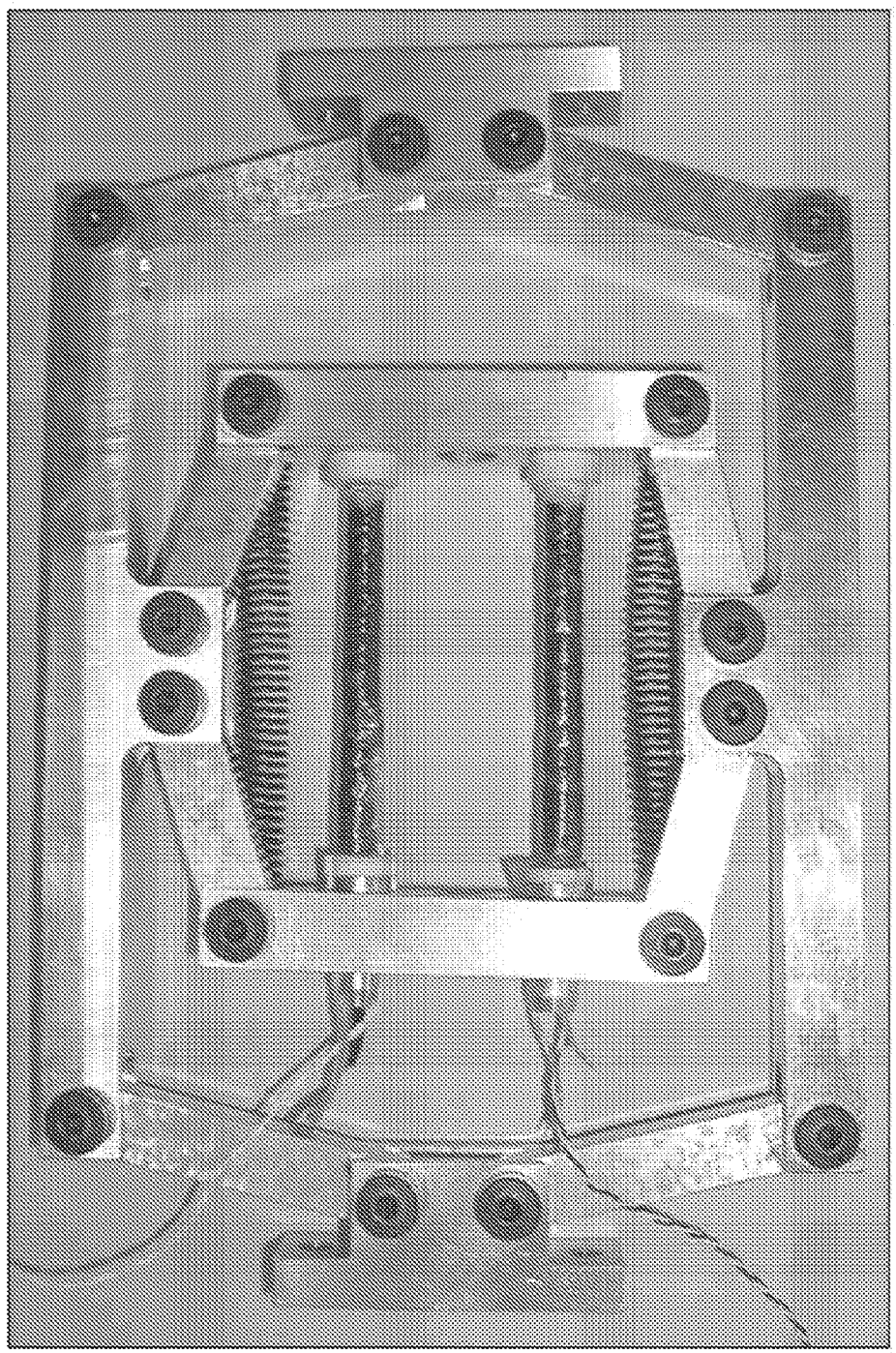

FIGS. 23a-e are schematic views showing a series of sequential positions of the module of FIG. 20 being operated to open and close a valve;

FIGS. 24, 25a and b and 26 are cross sectional, part side sectional and perspective views respectively of a module according to the invention;

FIGS. 27a and b are part side sectional views of another module according to the invention;

FIG. 28 is a cross sectional view of another module according to the invention;

FIGS. 29a-g are schematic views which show sequential steps in movement of the module of FIGS. 24-26 along a pipe;

FIGS. 30a-c are side sectional views showing yet another module according to the invention;

FIG. 31 is a graph showing the deflection measured from the two-stage actuator of FIGS. 5 and 6; and FIG. 32 is a photograph of an XYX planar prototype actuator.

Figure 1:
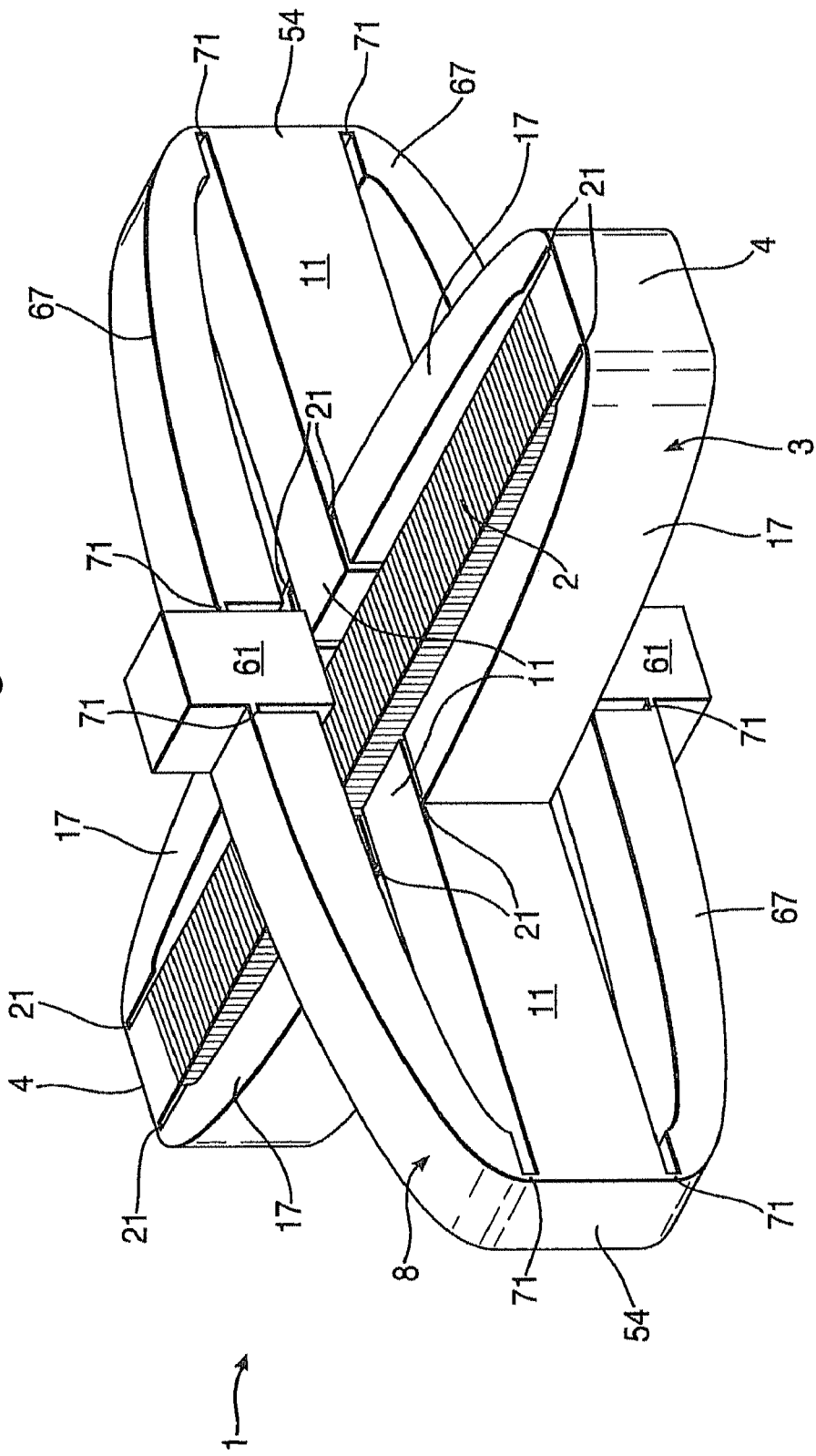
FIG. 1 is a perspective view of a transducer according to the invention.

Referring to FIG. 1, it shows a transducer which is an actuator 1 comprising a linear elongate driver member in the form of a piezoelectric PZT stack 2, which is contained within an inner, closed, substantially oval and substantially planar flextensional housing shell 3, which in turn is nested within an outer, similarly shaped, flextensional housing shell 8. Both shells comprise stainless steel. The PZT stack 2 can be activated by application of a voltage in a known manner. Electrical connection wires for activating the stack are not shown. Application of the voltage will cause the stack 2 to increase in length, the greater the voltage applied the greater the increase in length of the stack. The inner flextensional housing shell 3 surrounding the PZT stack 2 is substantially coplanar therewith. This inner flextensional housing shell 3 comprises contact portions 4 which contact respective opposite ends of the PZT stack 2. The contact portions 4 of inner housing 3 are in mechanical contact with the opposite ends of the PZT stack 2. Mid way between the contact portions 4 of the inner housing shell 3, and on opposite sides of the inner housing shell 3, are transmission portions 11 of the inner housing shell 3. Curved shoulder portions 17 of the inner housing shell 3 are located between the transmission portions 11 and the contact portions 4 and connected thereto by flexure hinges 21. The contact portions 4, shoulder portions 17 and transmission portions 11 are substantially rigid, and flexing of the hinges 21 provides the shell flexure which causes the transmission portions 11 to move relative to each other in response to a movement of the contact portions 4 of the inner housing shell 3. This is best described with reference to FIG. 2. Looking at that Figure it can be seen that dashed lines A, B drawn through the flexure hinges 21 on either side of the longitudinal axis of the inner housing shell 3, incline away from the driver axis towards the mid point of that axis. Thus, in operation, when the PZT stack 2 is actuated by application of a voltage thereto, and increases in length this causes the contact portions 4 of the inner housing shell 3 to move away from each other, and the flextensional housing shell 3 flexes at its hinges 21 to accommodate this movement. The flexing motion acts to tend to straighten the lines A, B, thereby moving the transmission portions 11 of the housing towards each other. The length and angles between the flexure hinges is such that a mechanical advantage is achieved and a small movement of contact portions 4 away from each other causes an amplified movement of the transmission portions 11 towards each.

Referring again to FIG. 1, the outer flextensional housing shell 8 surrounds the inner flextensional housing shell 3 and is arranged in an orthogonal plane to that of the inner housing shell 3. It is similar in design to the inner housing shell 3, comprising contact portions 54, curved shoulder portions 67 and flexure hinges 71. The contact portions 54 of the outer flextensional housing shell are integrally formed with the transmission portions 11 of the inner housing shell 3 so that they move together as one piece. This means that in operation, when the pzt stack 2 is activated causing the transmission portions 11 of the inner housing shell 3 to move towards each other, the contact portions 54 of the outer housing shell 3 must also move towards each other. In other words the transmission portions 11 of the inner housing shell 3 are acting as bridging driver members between the inner and outer flextensional housing shells 3 and 8. The relative movement between the contact portions 54 of the outer flextensional housing shell causes that shell to flex to accommodate that movement, resulting in the transmission portions 61 of the outer flextensional housing shell 8 moving away from each other. The relative displacement of the transmission portions 61 of the outer housing shell away from each other is amplified relative to the movement of the contact portions 54 of the outer housing shell towards each other, which in turn is amplified relative to the initial lengthening of the PZT stack 2. Thus a displacement that is amplified and then amplified again is achieved. Typically a single flextensional cell arrangement with one housing shell may achieve a displacement that is amplified by a factor of about 5. Therefore with the arrangement shown in FIGS. 1 and 2 an amplified displacement that is squared, e.g. of the order of 25 (5 times 5) may be achieved relative to the lengthening of the central driver member 2. Removal of the voltage from the ends of the stack 2 causes the stack to revert to its initial length and the flexure of the housing shells 3 and 8 to reverse so the transducer returns to its original state.

The inner housing shell may be considered as having a primary axis (which is coincident with the inner driver axis) and a secondary axis, which the transmission portions extend along. The transmission portions 11 extend along the secondary axis and project from the curved surface of the inner shell 3 as blocks directed orthogonally from the driver axis. The primary axis may be considered to be the larger major axis and the secondary axis the shorter minor axis, the extending block portions not being considered as contributing to dimension of the shell in their direction when talking about the "minor axis" of the inner shell.

The embodiment of FIG. 1 has been described as an actuator, i.e. operating by application of a voltage to cause an initial lengthening of the piezoelectric stack 2. However the same embodiment could be used as a sensor. For example if the lower transmission member 61 of the outer housing shell 8 (as viewed in FIG. 1) were fixed and the upper transmission portion 61 of that housing shell secured to a device, then any movement of the secured device inwardly of the outer housing shell 8 could be detected by flexing of the outer then the inner housing shell causing a strain to be induced in the piezoelectric stack 2, which can be detected as an electrical signal. In this case the arrangement is such that the displacement of the pzt stack 2 is less than the initial displacement being detected, but the force is magnified. This is advantageous in sensor applications, since a large force is generally needed for accurate detection using a PZT stack acting as a strain gauge. In general, the displacement and force achieved with flextensional transducers are related; a large force is obtained at small displacements and vice versa. Thus maximum force is achieved at zero displacement and maximum displacement is achieved at zero force.

Further embodiments are now described as actuators. It would be obvious to the man skilled in the art that these could also operate in reverse in a sensor mode. These further embodiments use the same materials for the driver member and housing shells as the FIGS. 1 and 2 embodiment, unless otherwise specified.

Figure 2:
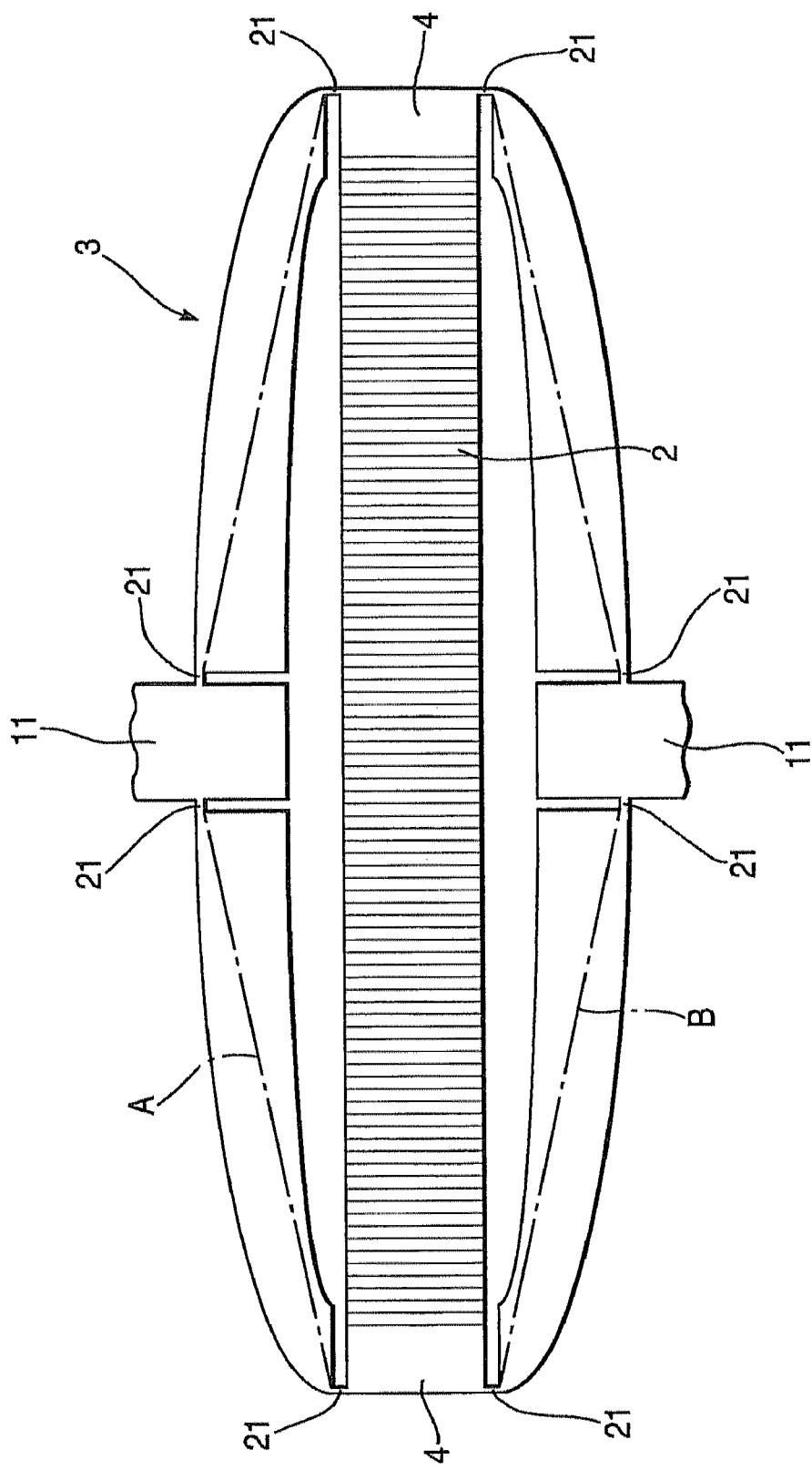
FIG. 2 is a plan truncated view of only the inner housing shell and contained driver member of FIG. 1.
Figure 3:
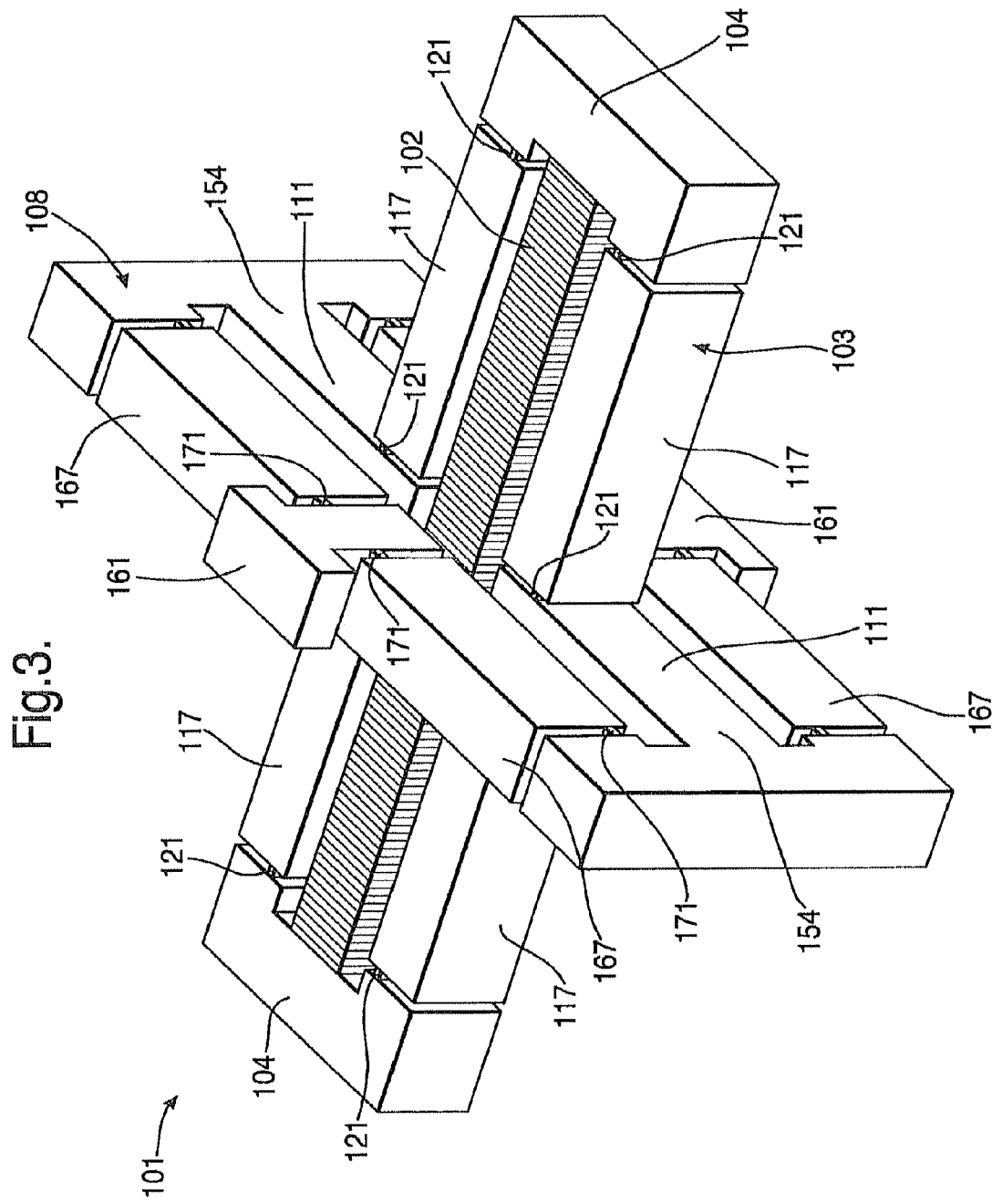
FIGS. 3 and 4 are perspective views of a second transducer according to the invention, respectively before and after actuation of the driver member of the transducer.
Figure 4:
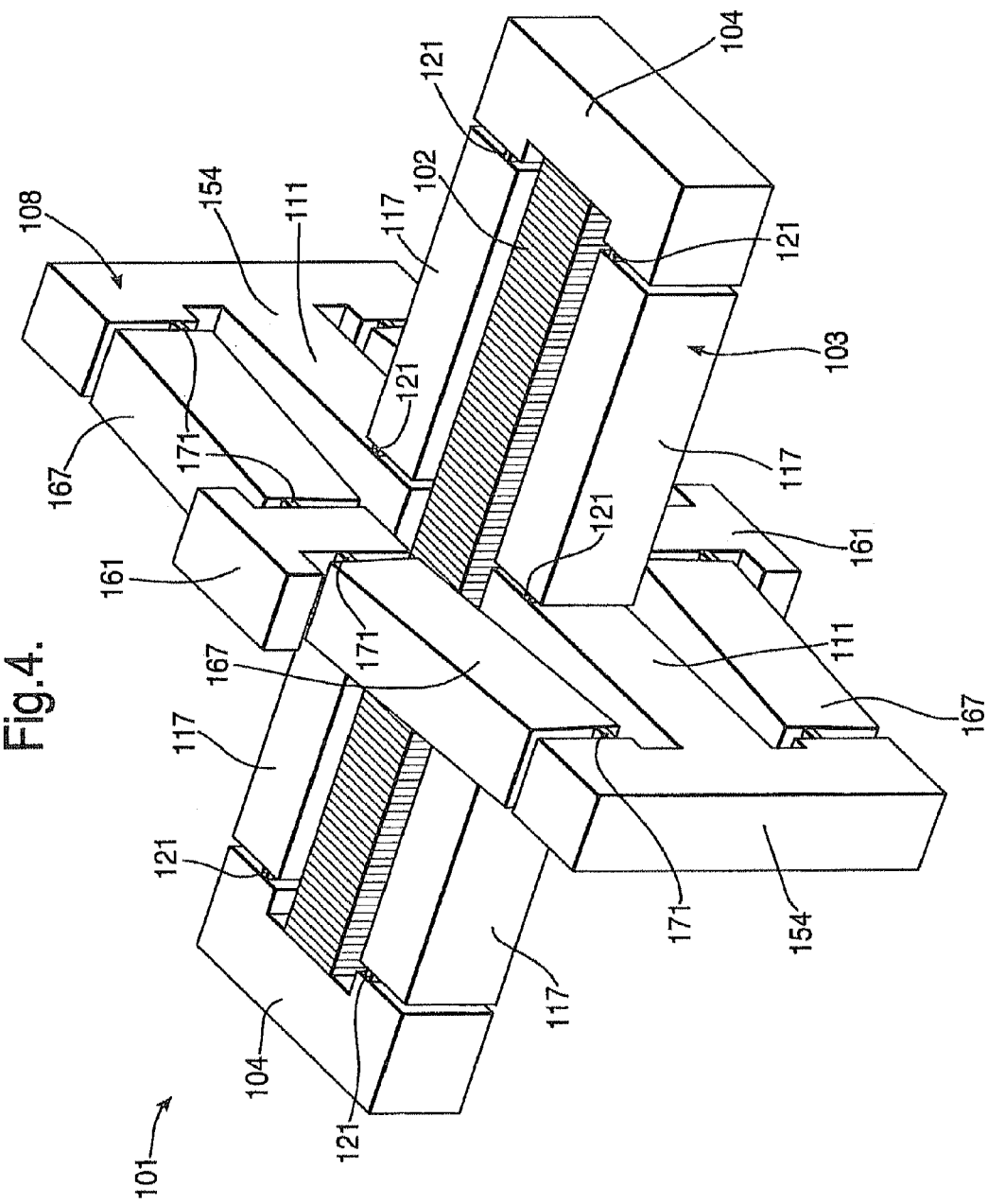

Referring to FIGS. 3 and 4, these shows an actuator 101 which is similar in design to the embodiment shown in FIGS. 1 and 2, but it is generally rectilinear in shape rather than oval, having substantially straight sides rather than including curved surfaces. In the embodiment shown in FIG. 3 parts having a similar function to those in the embodiment of FIG.

1 are given the same reference number plus 100. The actuator 101 comprises a linear elongate driver member which is in the form of a piezoelectric PZT stack 102 that is contained within an inner flextensional housing shell 103, which in turn is contained within a outer flextensional housing shell 108. The PZT stack 102 can be activated by application of a voltage in the same manner as the PZT stack of the FIGS. 1 and 2 embodiment. The inner flextensional housing shell 103 surrounding the PZT stack 102 is substantially coplanar therewith. As before, the inner flextensional housing shell 103 comprises a pair of contact portions 104 which contact opposite ends of the PZT stack 102. As before, the contact portions 104 of housing 103 are in mechanical contact with the opposite ends of the PZT stack 102. However, in this case the contact portions of the inner housing shell 103 project laterally of the length of the PZT stack 102, rather than being the same cross-sectional shape and size as the PZT stack as they are in the embodiment of FIGS. 1 and 2. This allows for their easy connection through straight shoulder portions 117 to the transmission portions 111, which similarly extend laterally of the PZT stack 102. As in the previous embodiment connection of the shoulder portions 117 to both the contact portions 104 and to the transmission portions 111 is via flexure hinges 121 (only some of which are visible in the perspective view of FIGS. 3 and 4). These hinges are positioned so that imaginary lines drawn through the flexure hinges on either side of the PZT stack would incline away from the stack 102 towards the mid point of the PZT stack 102. Thus, in operation, when the PZT stack 102 is actuated by application of a voltage thereto and increases its length, it causes the contact portions 104 of the inner housing shell 103 to move away from each other, and the flextensional housing shell 103 flexes at its hinges 121 to accommodate this movement. The flexing movement acts to tend to straighten the imaginary lines drawn through the flexure hinges on either side of the PZT stack, thereby moving the transmission portions 111 of the housing towards each other. An outer flextensional housing shell 108 surrounds the inner flextensional housing shell 103 and is arranged in an orthogonal plane to that of the inner housing shell 103. It is similar in design to the inner housing shell 103, comprising contact portions 154, straight shoulder portions 167 and flexure hinges 171. As in the FIG. 1 embodiment, the contact portions 154 of the outer flextensional housing shell are integrally formed with the transmission portions 111 of the inner housing shell 103, so that when the PZT stack 102 is activated it causes the transmission portions 111 of the inner housing shell 103 (and hence the contact portions 154 of the outer housing shell 108) to move towards each other, resulting in the transmission portions 161 of the outer flextensional housing shell moving away from each other. This movement is clearly evident when comparing FIGS. 3 and 4. In FIG. 4 the movement is magnified by a factor of ten times the actual movement, so that the change can be clearly seen. The transmission portions 161 are generally T-shaped in this embodiment. As in the embodiment of FIGS. 1 and 2 a displacement that is amplified and then amplified again is achieved, the transmission portions 161 typically moving relative to each other a distance that is about 25 times the extension in length of the PZT stack 102.

FIGS. 5 and 6 are perspective views of a third actuator according to the invention, respectively before and after actuation of the driver member of the actuator. This embodiment is similar to the embodiment shown in FIGS. 3 and 4, except that each of the straight sided shoulder portions 117 has been replaced by a pair of parallel shoulder portions 117' of reduced cross-sectional area. The pairs of shoulders and associated pairs of flextensional hinges make the structure of the actuator body more rigid, advantageously transmitting more force.

By way of example, for the embodiment of FIGS. 5 and 6, each housing 103 108 is made with a thickness of 12 mm, the height of the outer housings (including the T shaped transmission members is 50 mm, the length of the housing is 70 mm, the separation of the contact portions is 50 mm, and the inserted PZT stack 102 is 51 mm, so there is an initial preload on the PZT stack, the stack being inserted by applying finger pressure to the housing to make it flex slightly, and the length of each shoulder portion 117 is 20 mm. These dimensions are illustrative of those typical for actuators according to the invention but larger or smaller actuators could be used. Thus, in this particular prototype the two shells are identical in size, but are configured so that one shell can nest orthogonally within the other.

FIG. 31 is a graph showing the deflections measured for a prototype constructed according to the FIG. 5 design. The lowest (dotted) line shows the actual deflection of the PZT stack, while the middle (bold) line shows the magnified deflection (~×7) achieved by a single shell. The highest plot shows the total deflection achieved by the assembled two-stage actuator, which did achieve further magnification but was limited by the basic nature of the prototype.

In the embodiments described so far, the PZT stack, the transmission portions of the inner housing shell and the transmission portions of the outer housing shell all move on actuation in mutually orthogonal directions. Thus using the common X,Y,Z axis nomenclature, if the PZT stack lengthens in the X direction, then the transmission portions 11 of the inner housing shell can be considered to move relative to each other in the Y direction, and the transmission portions of the outer housing shell move relative to each other in the Z direction. In this specification we call these XYZ transducers.

It is also envisaged that other designs are possible, particularly XYX transducers. Examples of such transducers are described with reference to FIGS. 7-9.

Figure 7:
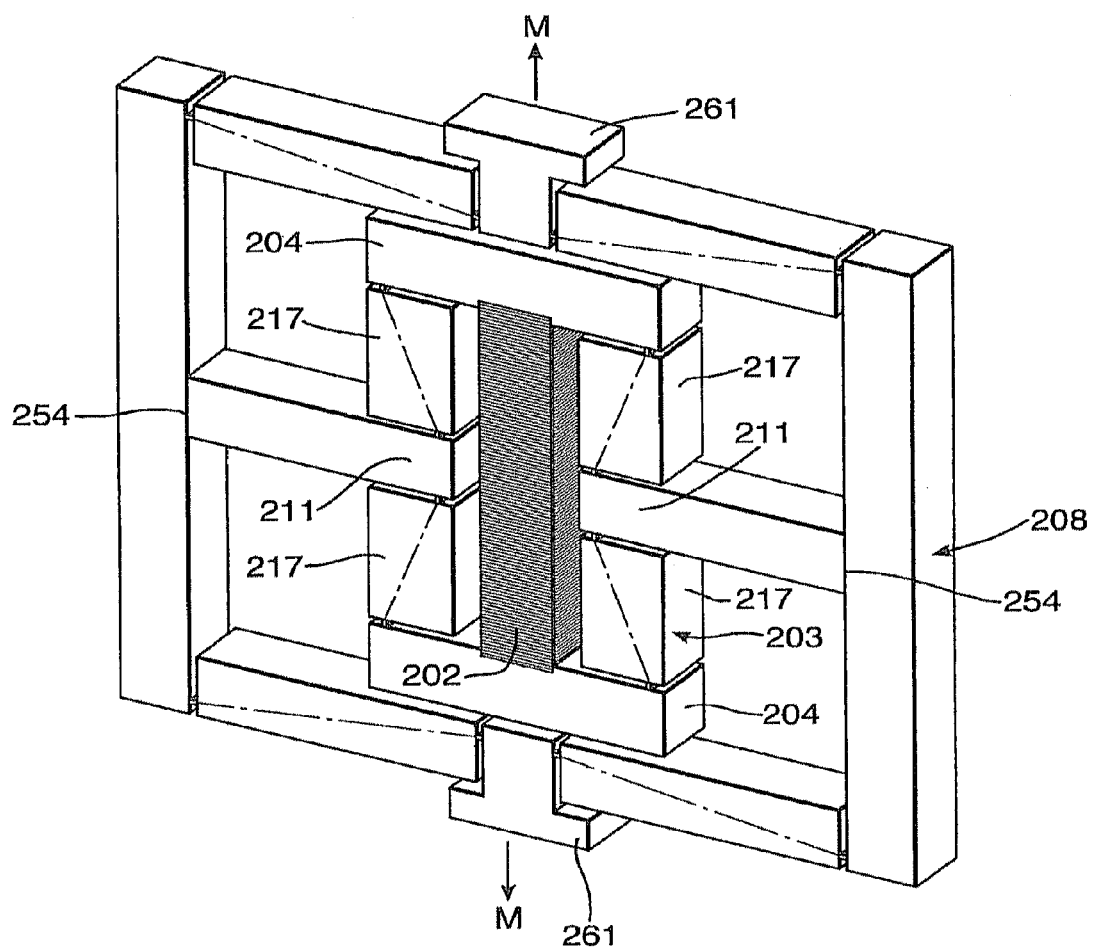
FIGS. 7-11 are perspective views of fourth to eighth transducers according to the invention.

In FIG. 7, a PZT stack 202 is surrounded by an inner housing shell 203, which in turn is surrounded by an outer housing shell 208. The PZT stack 202, and the inner and outer housing shells 203 and 208 are all substantially planar and are positioned in a common plane. The principle of movement on actuation is the same as in the previous embodiments and in FIG. 7 dotted lines have been drawn between the flexure hinges 221 that connect the contact portions 204 and the transmission portions 211 to the straight shoulder portions 217 of the inner housing shell 203. Similarly, in the Figure dotted lines have been drawn between the flexure hinges of the outer housing shell 208. Thus when the PZT stack 2 is actuated and lengthens the said contact portions 204 of the inner housing shell move away from each other, causing the transmission portions 211 of the inner housing shell 203 to move away from each other. These act as a bridging driver for the outer housing shell 208 causing the contact portions 254 of that housing shell to move away from each other, and consequently causing transmission portions 261 of the outer housing shell 208 to move away from each other in the direction indicated by arrows M. Thus if lengthening of the PZT stack 202 is considered to be in the x direction, then movement of the transmission portions 211 of the inner housing shell 203 can be considered to be in the y direction, and the final movement in the direction M of the of the transmission portions 261 of the outer housing shell is again in the x direction. Thus this embodiment functions as an xyx direction actuator. As in the previous embodiments the output displacement of each housing shell is amplified relative to its input displacement, so that an initial lengthening of the PZT stack 202 is amplified to a squared value, typically by 5 times 5, resulting in a displacement that is 25 times that of the lengthening of the PZT stack (but at correspondingly reduced force).

Figure 8:
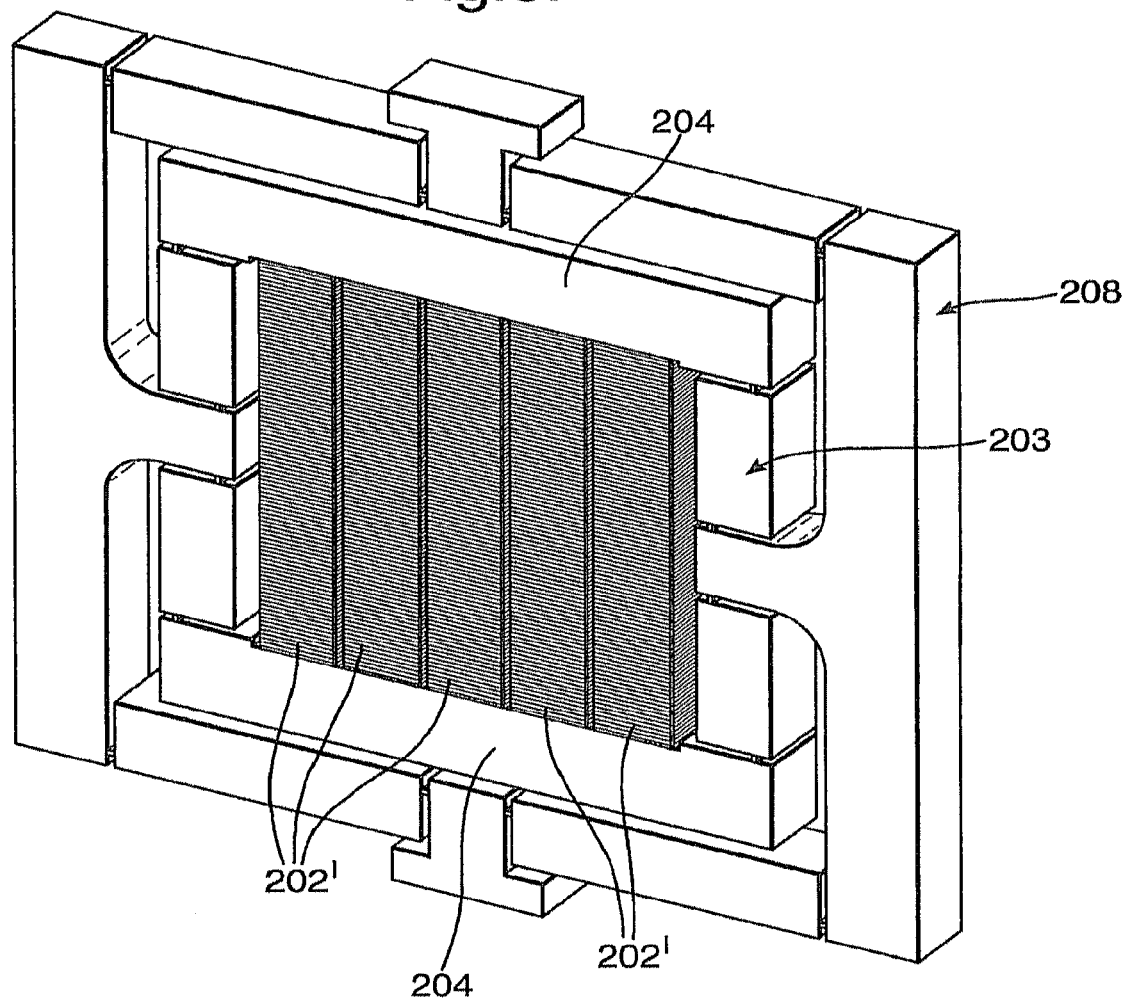

FIG. 8 illustrates a further actuator embodiment. This embodiment is similar to that shown in FIG. 7; except that the singe PZT stack 202 is replaced by five identical stacks 202' extending parallel to each other between the contact portions 204 of the inner housing shell 203. These pzt stacks are acting in parallel. Hence they act to magnify by a factor of 5 (since there are 5 stacks) the force that would be applied by a single stack. They do not magnify the displacement. This is another example of an XYX actuator, movement of the component parts being the same as that of the FIG. 7 embodiment.

Figure 9:
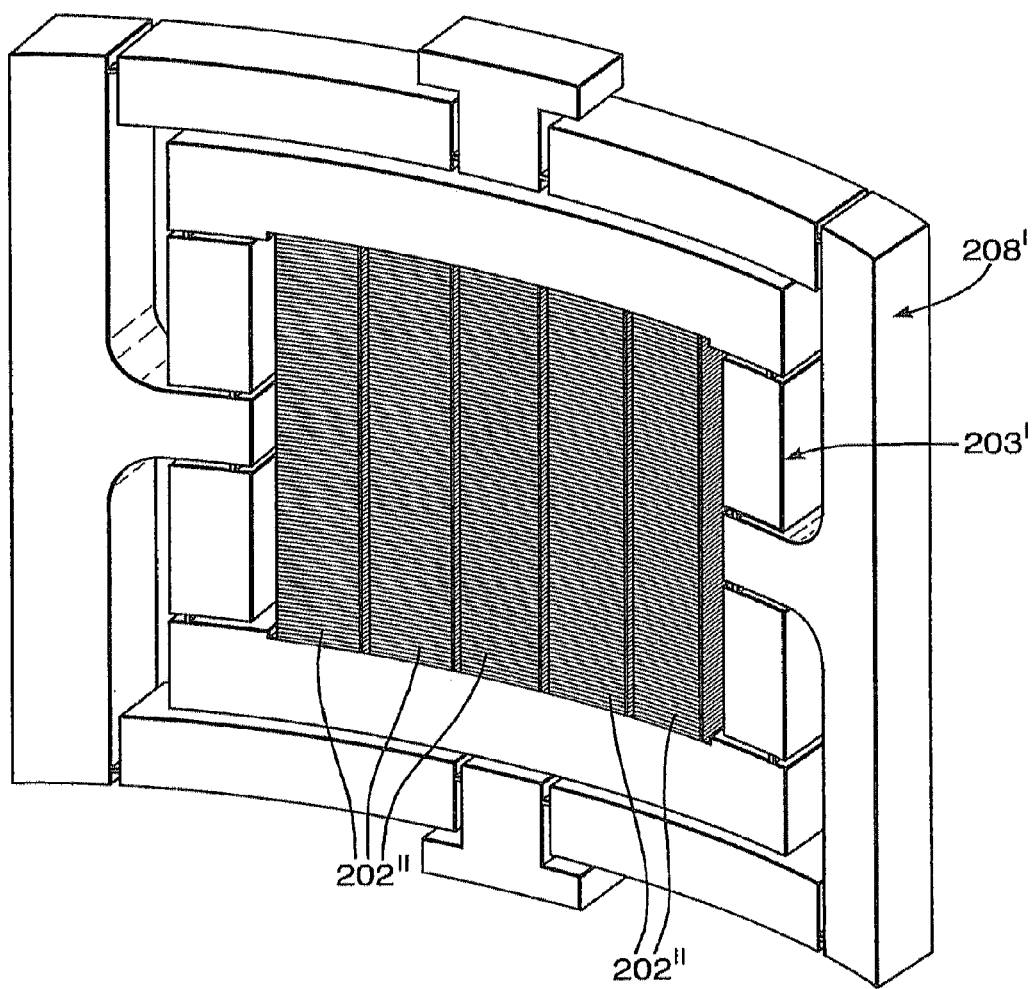

FIG. 9 illustrates an embodiment similar to that of FIG. 8 and like parts are given like reference numbers with an additional prime'. The FIG. 9 embodiment differs from the FIG. 8 embodiment in that the housing shells 203' and 208' are not planar. Instead they lie within a common curved surface that is curved in the form of part of a curved cylindrical surface, the five PZT stacks 202" extending parallel to the axis of such a cylinder, in the curved surface. This embodiment can also be considered an XYX actuator, considering the direction of movement of any given point on the curved surface of the housing shells. Such an actuator might find particular application on or in curved objects, for example cylindrical containers, tanks, or pipes, or around cables or cable enclosures.

A prototype two-stage planar XYX actuator was constructed from aluminium and is shown in the photograph of FIG. 32. The driver mechanism comprises two 9 cm SMA rods, made from commercially available shape memory alloy, each surrounded by a heater coil causing them to expand upon heating to a second extended length. When heating ceases, the SMA rods remain extended and are forced to revert to their original length by two outwardly disposed springs also mounted inside the inner shell. Since the SMA driver members undergo larger displacements and transmit larger forces than the PZT stacks, the hinges within the prototype need to be pin hinges.

When tested under an 8 Kg load, the prototype underwent the following displacements for a 2 mm displacement of the actuating SMA elements:

TABLE 1

Performance of the prototype XYX actuator for a 2 mm displacement of the actuating (SMA) elements.

|  | First stage displacement mm | Second stage displacement mm |
|---|---|---|
| Analytical predictions | 6.2 | 26.7 |
| Test measurements | 6 | 24 |

Thus, it will be seen that a displacement amplification for the two stages of ×12 was achieved. This was very close to the predicted amplification of 13.6.

In the prototype shown in FIG. 32, there are Only single shoulder portions connected to the transmission portions. However, in an improved design, these may be replaced by pairs of parallel shoulder portions (similar to the twin levered design employed in the FIGS. 5 and 6 embodiments) in order to impart more rigidity and stability. Furthermore, a working actuator would, of course, be constructed from a more suitable material such as hard steel.

Figure 10:
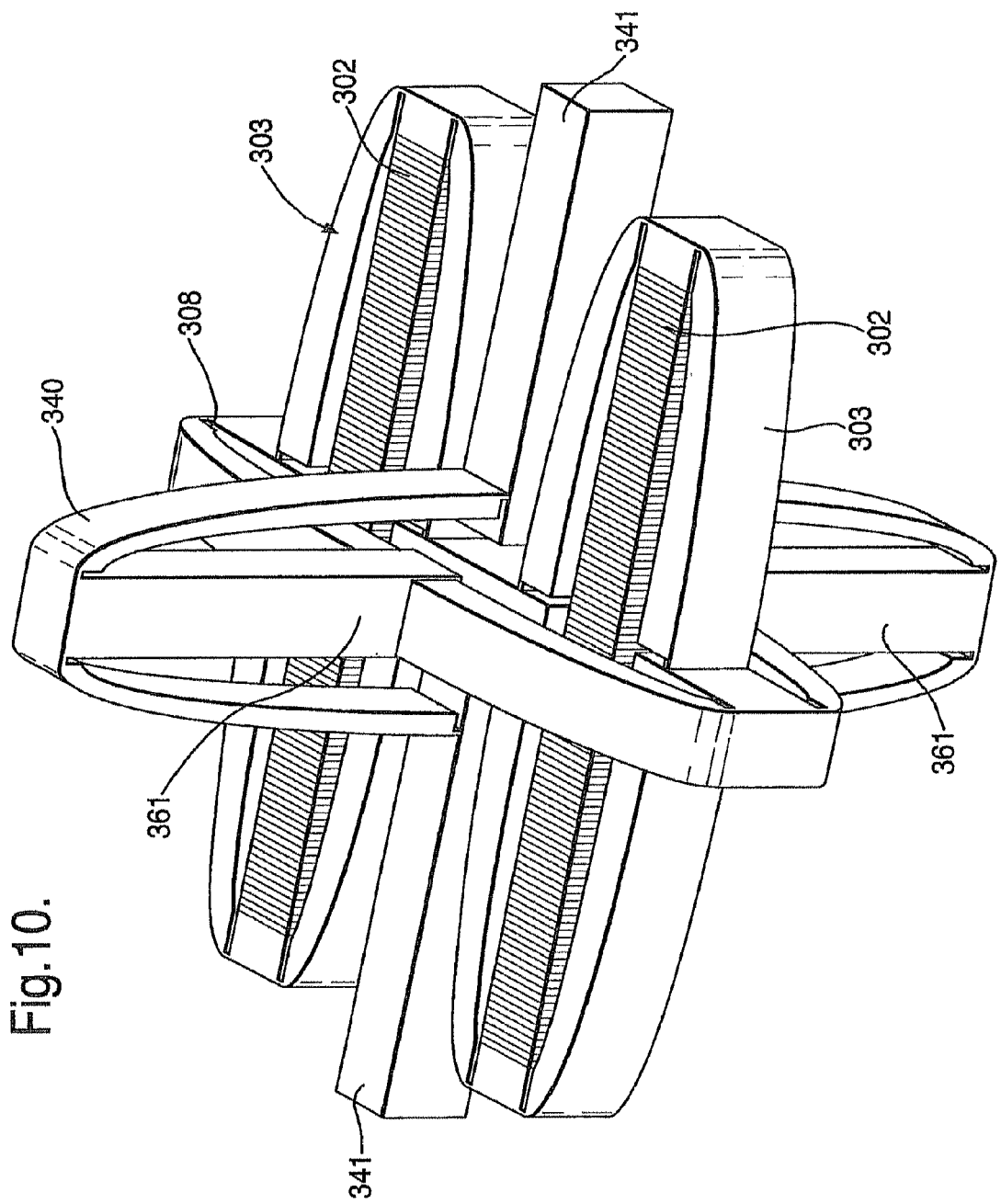

The embodiments shown so far have all used two nested housing shells to amplify the displacement (or force in the case of sensors) achieved (typically ×5×5). However it is also envisaged that more than two housing shells could be used to amplify the displacement or force still further, the transmission portions of each nested shell acting as the driver member for the nearest surrounding shell. FIG. 10 illustrates an embodiment of this type with effectively three nested shells. In this figure, parts having a similar function to those in FIG. 1 are given like reference numerals with an additional 300. In this case there are effectively two inner housing shells 303, each with a separate PZT driver stack 302, extending parallel to each other and within an orthogonally arranged outer housing shell 308. That housing shell 308 is contained with another "outermost" housing shell 340, the transmission members 361 of the "outer" (in this case intermediate) housing shell 308 acting as the driver member for the outermost housing shell 340. Thus the three sets of nested housing shells are termed, sequentially as follows: inner, outer, and outermost. In operation the PZT stacks 302 lengthen, causing the transmission members 311 of the inner housing shells 303 to move towards each other, the transmission members 361 of the outer housing shell 308 to move away from each other, and the transmission members 341 of the outermost housing shell 340 to move towards each other. Each housing shell amplifies the displacement, so the overall amplification of the lengthening of the PZT stack 302 is cubed. For example, if the amplification achieved by each shell is times five, then the overall amplification is $5^3$ or 125. Each amplification is at reduced force, and this reduction is mitigated in this embodiment by the use of twin inner housing shells 303, which are nested within a single outer housing 308 and which act in parallel to double the applied force relative to that of a singe inner housing shell.

Figure 11:
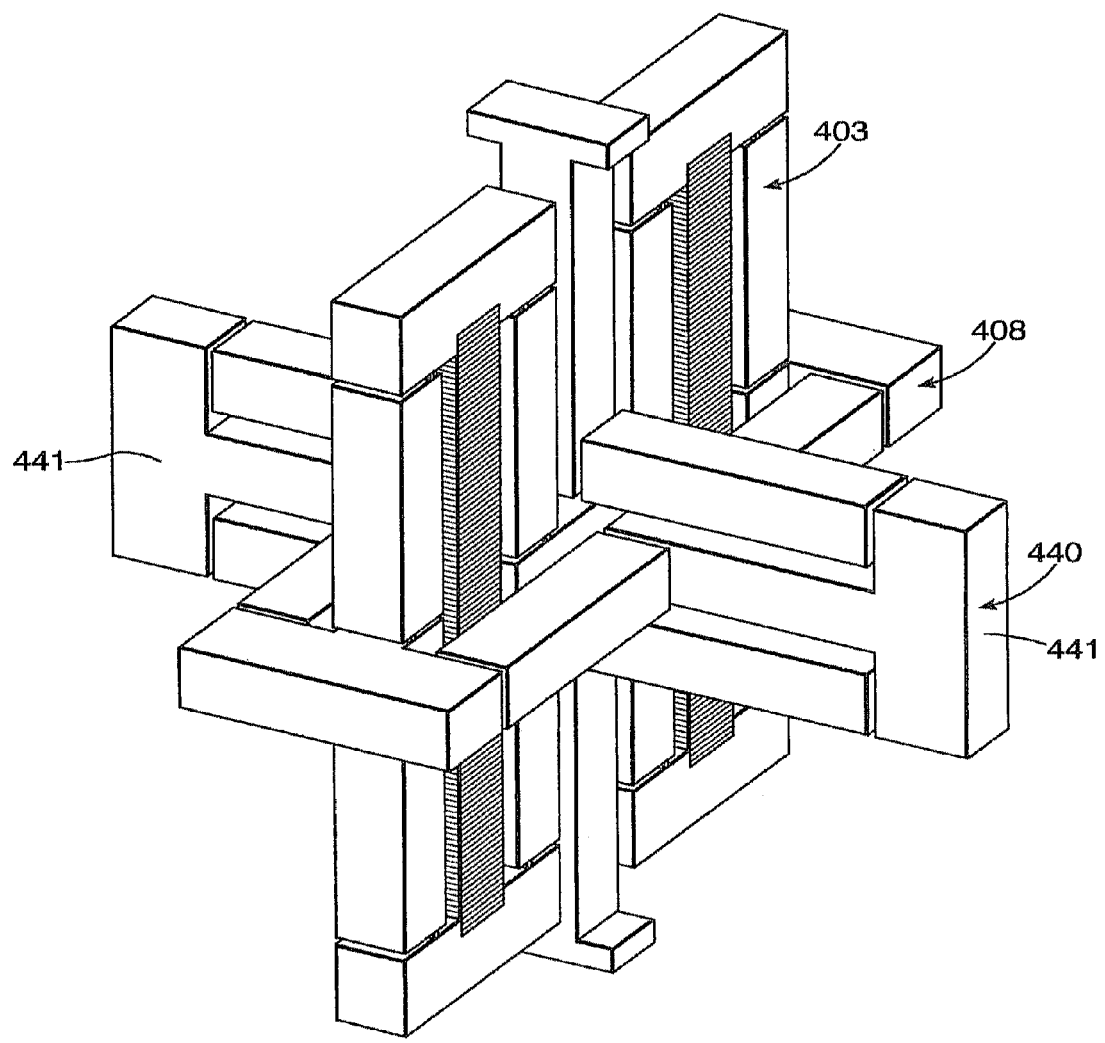

FIG. 11 describes an embodiment that is the same in operation as that of FIG. 10; but which uses straight sided, nested, rectilinear flextensional housing shells 403, 408, 440, the transmission portions of each nested housing shell acting as a driver member for the subsequent outer flextensional shell, such that an initial displacement resulting from an electrically activated increase in length in the PZT stacks 402 of the twin inner housing shells 403 results in a much amplified relative movement of the transmission portions 441 of the outermost flextensional housing shell 440 towards each other. The amplification is the same as in the FIG. 10 embodiment.

Figure 12:
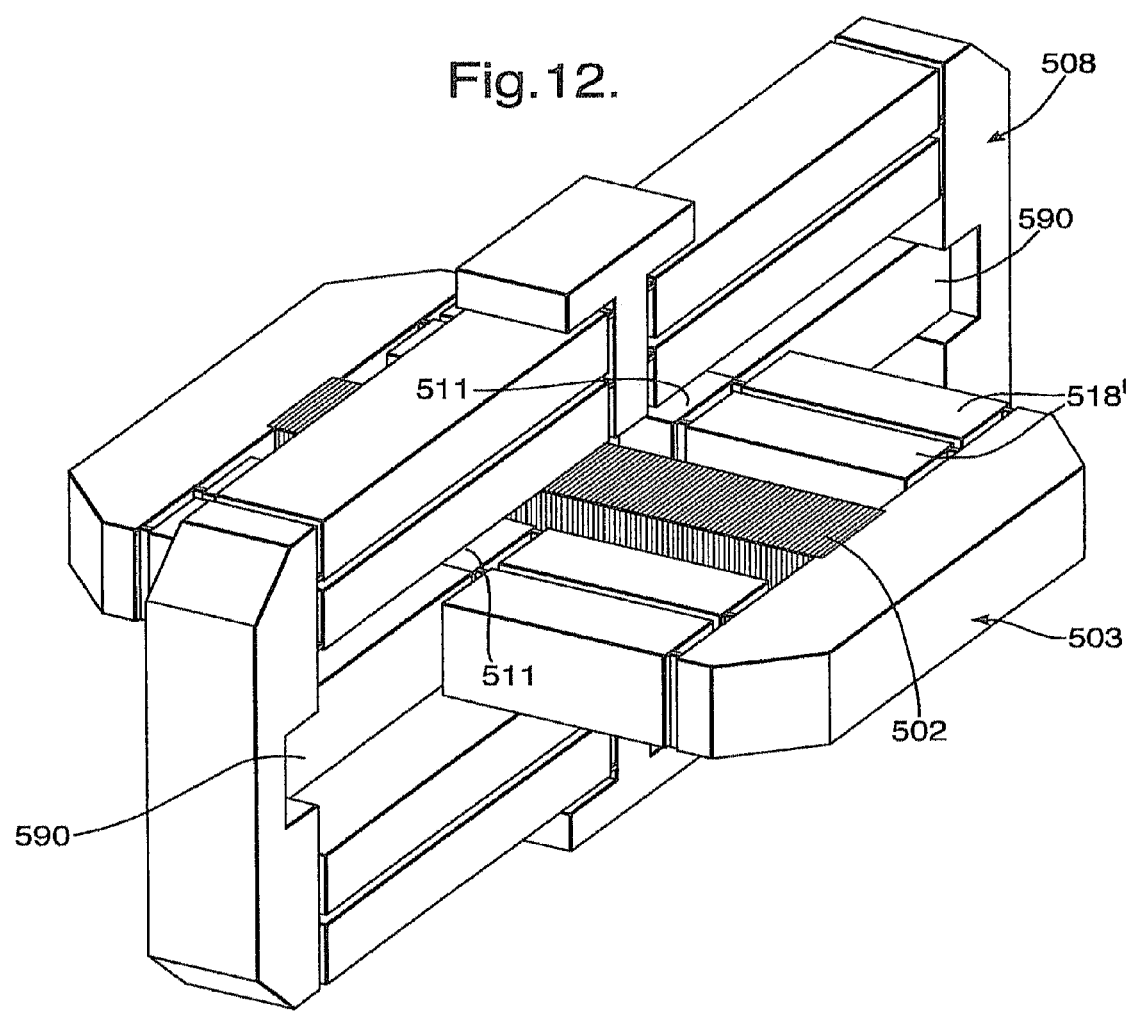
FIGS. 12-13 are perspective views of a ninth transducer according to the invention, respectively prior to actuation of the driver member of the transducer at room temperature, and at elevated temperatures.
Figure 13:
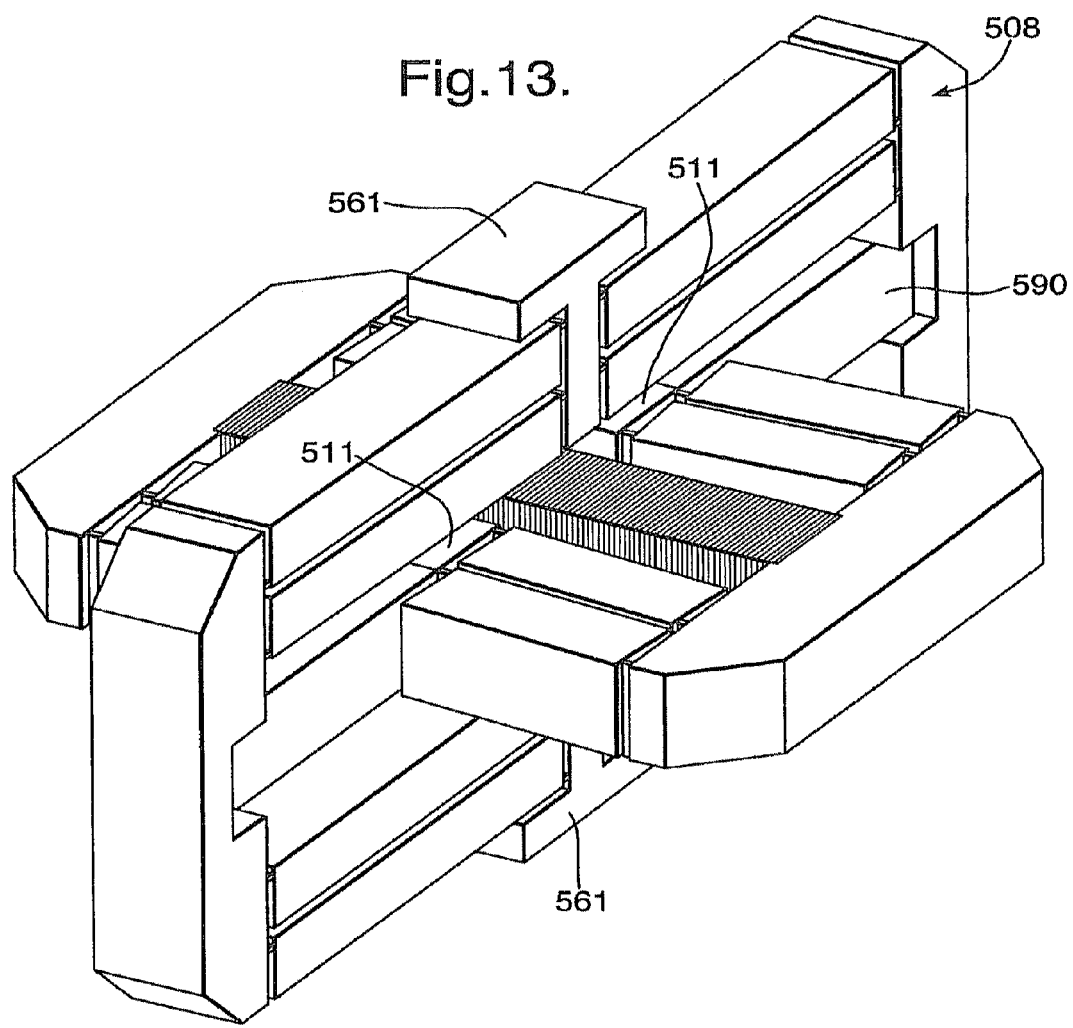
Figure 14:
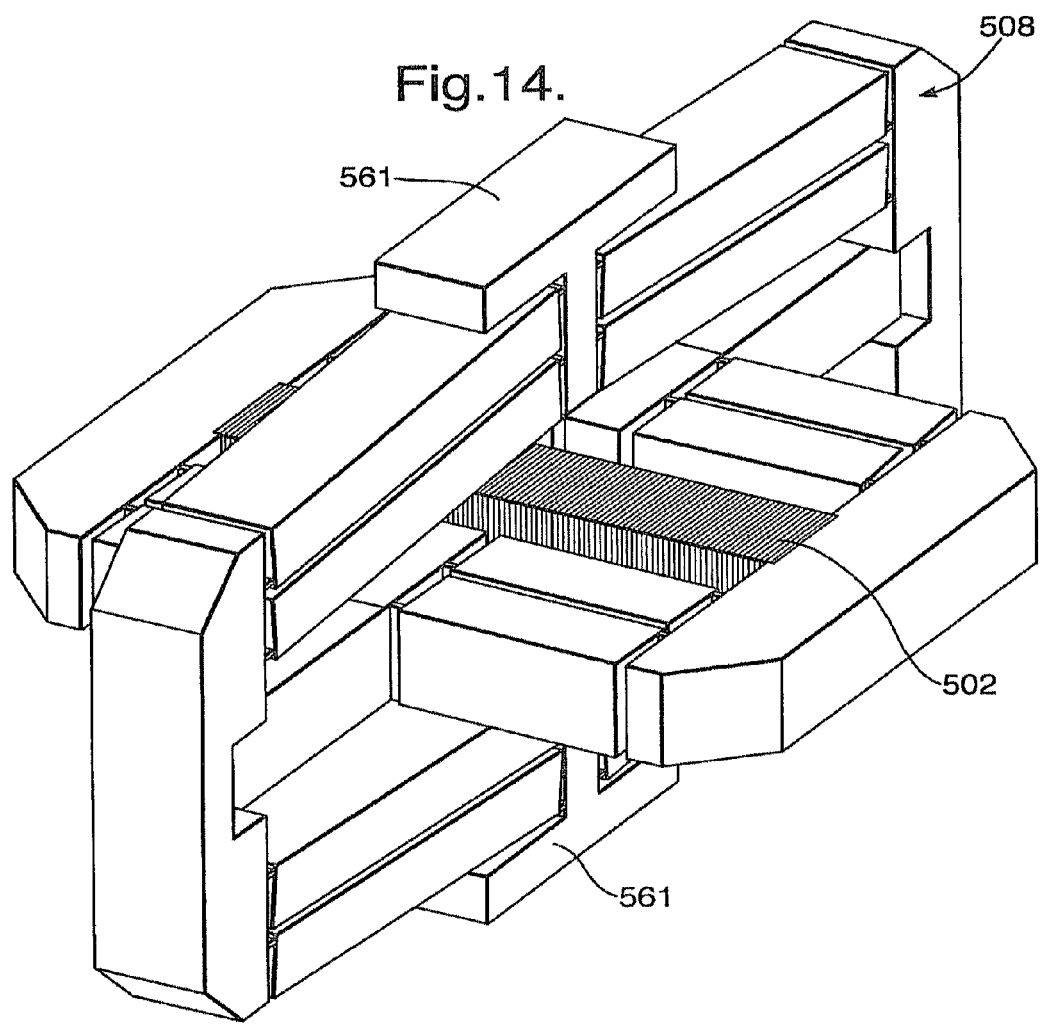
FIG. 14 is a perspective view of the transducer of FIGS. 12 and 13 after actuation of the driver member of the transducer.

FIGS. 12-14 describe an embodiment that is similar to that of FIGS. 5 and 6 and like parts are given like reference numerals plus 400. The embodiment of FIGS. 12-14 is identical in operation to that of the embodiment of FIGS. 5-6, except that the completely stainless steel housing shells of the FIG. 5/6 embodiment are replaced in part by thermal compensating portions 590. In particular these thermal compensating portions 590, which are made of aluminium, provide part of the transmission portions 511 that extend from the inner housing shell 503 to act as the bridging driver for the outer housing shell 508. The purpose of the thermal compensating portions is to enable the device of FIGS. 12-14 to be stored at room temperature but be capable of operating over a wide range of temperatures, typically −70° C. to 550° C. without any loss of contact of the contained PZT stack 502 and the inner housing shell 503.

If the embodiment of FIGS. 5 and 6 were to be used at high temperatures, for example at 400° C. or 500° C., the flextensional stainless steel metal housings 103 and 108 would expand significantly more than the piezoelectric stack 102 (which has a significantly lower coefficient of thermal expansion than the metal housing), and the piezoelectric stack 102 would simply fall out of the surrounding shell 103, particularly if subjected to vibration in use. Typically stainless steel has a coefficient of thermal expansion that is significantly higher than the coefficient of thermal expansion of the PZT stack. Extreme temperature environments (e.g. −70° C. to 550° C.) do exist in several applications, for example, in the aerospace industry and in the space industry, and it is desirable for the transducers according to the invention to be able to operate in such environments. Thus the modified embodiment of FIGS. 13-15 uses thermal compensating portions 590 made from a material having a higher thermal coefficient of expansion than that of the remainder of the stainless steel housing, to compensate for the difference in the coefficient of expansion of the PZT stack 502 and the inner housing shell 503. The thermal compensating portions 590 expand more than the remainder of the housings at elevated temperatures, causing the transmission portions 511 of the inner housing 503 to move towards each other, which causes the inner housing shell 503 to flex and consequently causes the contact portions 504 to move towards each other to compensate for the different expansions of the housing 503 and the stack 502. Thus the contact between the contact portions 504 of the inner housing 503 and the PZT stack 502 is maintained. Computer modelling can be used to model the optimum length of the thermal compensating portions 590 and the relevant position of the flexure hinges in the inner housing shell 503 to ensure that the contact is maintained over the desired temperature range.

FIG. 13 shows the embodiment of FIG. 14 at 400° C., before activation of the PZT stack. In this figure, dimensional changes are magnified by a factor of 10. It is clear from the figure that the greater expansion of the thermal compensation portions 590 has caused movement of the transmission portions 511 of the inner housing 503 towards each other, while there is no outward movement of the transmission portions 561 of the outer housing 508. In contrast, FIG. 14 shows the deformation of the embodiment as a result of activation of the PZT stack 502. In this case the resultant outward movement of the transmission members 561 of the outer housing shell 508 can clearly be seen.

Figure 15:
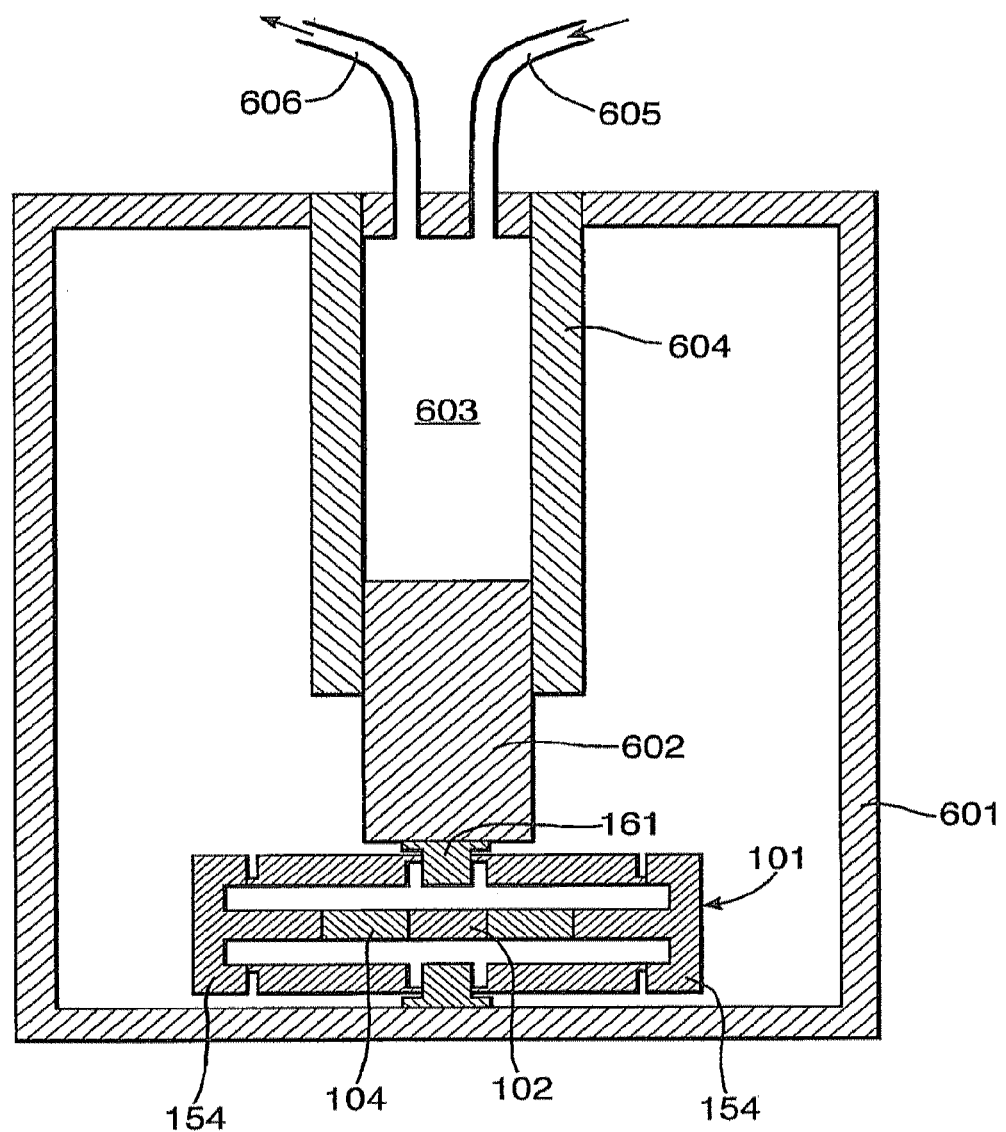
FIG. 15 is a cross-sectional view showing the actuator of FIGS. 3 and 4 operating a piston pump.

FIG. 15 shows the actuator 101 of FIGS. 3 and 4 being used to drive a single piston pump. The actuator 101 is positioned in pump casing 101 so that the lower transmission member 161 is fixed to the casing floor, and upper transmission member 161 of the outer housing 108 of the actuator 101 is in contact with a piston 602. When a voltage is applied, the actuator pushes the piston 602 into the pump chamber 603 hence discharging some of the fluid through outlet 606. When the voltage is removed, the actuator returns back to its original position, hence pulling piston 602 with it. This in turn draws fluid in through inlet 605. The cycle is repeated for continuous pumping. For example, this can be achieved by applying a DC biased sine wave drive form to the piezoelectric stack 102 of the actuator 101. The frequency of the wave form determines the frequency of operation of the pump, and it preferably operates up to a maximum of several hundred Hertz. This pump could be used within the medical industry to deliver a desired quantity of fluid, e.g. blood or oxygen, to a patient. Other areas of application include fuel injection systems and any applications where a given quantity of fluid is required several times over a given time period.

FIG. 16 shows the actuator 101 of FIGS. 3 and 4 located in a rotor blade structure. The actuator 101 is secured between part of the blade 700 and trailing edge flap 702. Movement of actuator 101 cases the trailing edge flap to rotate around pivot point 704 in the trailing edge flap. The trailing edge flap will deflect both above and below the neutral position at frequencies up to tens of Hertz.

FIG. 17 is a similar view through a complete wing section, two actuators 101 being located in the wing between the leading edge flap 710 and the central part of the wing 712 and between the trailing edge flap 702 and the central part of the wing 712. Actuation of the actuators 101 causes the end flaps to rotate around pivot points 704.

Figure 18:
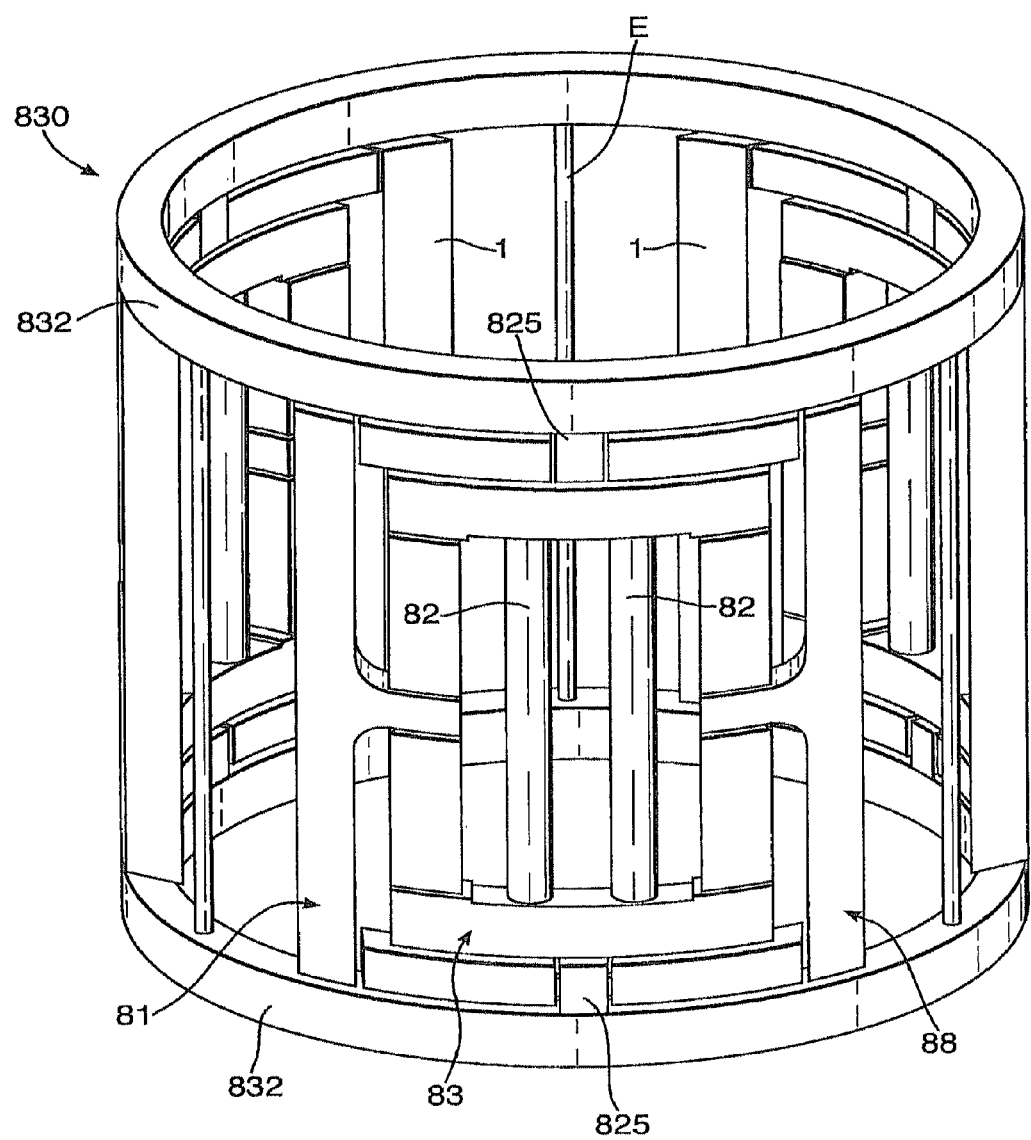
FIG. 18 is a perspective view of a module according to the invention incorporating transducers according to the invention.

FIG. 18 is a perspective view of a transducer module 830 according to the present invention comprising three transducers 81 similar in design to those shown in FIG. 9, but each comprising two SMA driver rods 82 instead of the five piezoelectric driver rods 202'' shown in the curved transducers of FIG. 9. Both shells 83 and 88 of each transducer 81 comprise stainless steel and each SMA rod 82 comprises a modified titanium nickel alloy composition having a martensite/austenite transition temperature above 150° C. Heating coils (not shown) surround each SMA rod 82, and these can be activated by passing an electrical current through them so as to heat the SMA rods 82 above their transition temperature causing the rods 82 to increase in length, and hence to cause the transducers 81 to flex and the transmission portions 825 of the outer shells 88 of each transducer 81 to move away from each other. The three transducers 81 are arranged circumferentially relative to each other, and annular rings 832 at the top and bottom of the module are integrally formed with (and hence mechanically connected to) the transmission portions 825 of the outer shells of each of the transducers 81. The module is substantially cylindrical, and the rings 832 define respective end circumferences of the module, and the transducers 81 lie in a common curved surface that defines the curved surface of the cylindrical module. Thus as the transmission portions 825 of each transducer 81 are moved away from each other the rings 832 are similarly moved away from each other, i.e. their axial separation increases. It may be desirable to place stabilising elements 'E' circumferentially around the module in between the transducers 81, as shown in FIG. 18. These should be extensible and may comprise retaining rods (disposed in guide channels (not shown) in the rings 832) or may comprise retaining springs.

Figure 19A:
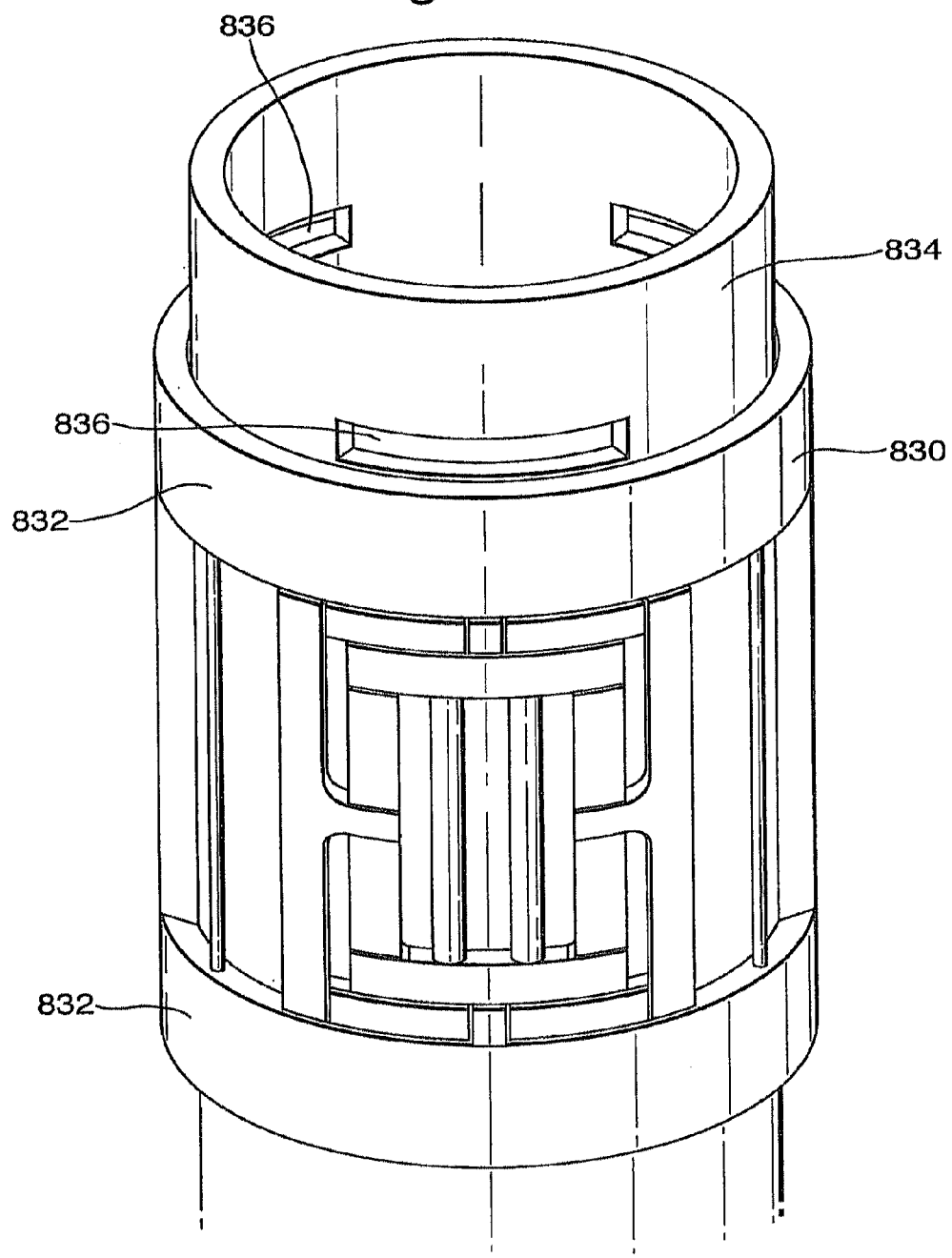
FIGS. 19a and 19b are perspective views which show the module of FIG. 18 operating to close a valve in a downhole pipe.

FIG. 19a shows the module 830 of FIG. 18 installed around a downhole pipe 834 so that the upper ring 832 is immediately below valve openings 836 in the pipe 834, which are to be closed. In operation the lower ring 832 is retractably gripped to the pipe 834, the SMA rods 82 are heated (for example by passing electrical current through wires helically wrapped around the rods) causing the module 830 to increase in length, thereby covering the valve openings 836 in the pipe. The module is shown in its lengthened move position in FIG. 19b. At this stage the heat is still being applied to rods 82. The upper ring 832 is then retractably gripped to the pipe, the heating of the SMA rods is stopped allowing the rods to cool and revert to their original length, causing the module 830 similarly to revert to its original length and the module to move up the pipe 834. To reopen the valve the gripping, module actuating operations can be reversed.

Figure 19B:
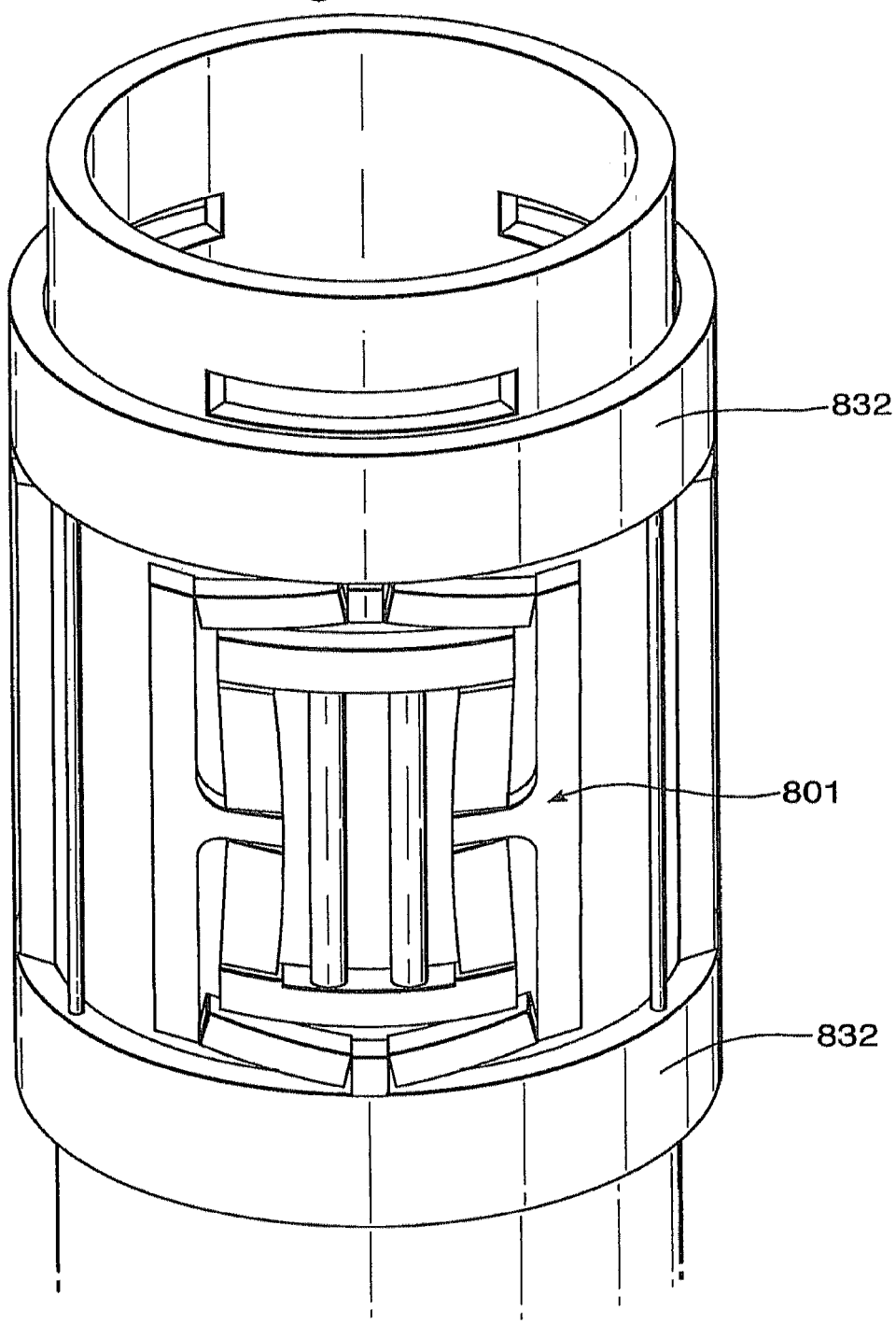

FIG. 20 shows a modular assembly 829 of two modules 830' and 830'', similar to the module 830 of FIG. 19a, and arranged axially relative to each other, the upper module is referenced 830' and the lower module as 830''. The modules 830' and 830'' may be considered as "bracelets" positioned adjacent each other. In the arrangement shown in FIG. 20 the bracelets 830' and 830'' are integrally formed with each other so that they always move together, sharing a common annular ring 832' between them. As an alternative to a common central annular ring 832', the upper bracelet 830' may simply rest or "piggy back" on the other bracelet 830'', so it is in mechanical contact with it, so it may be moved by the other ring, or move independently of it. The arrangement of FIG. 20 may advantageously be used for the same embodiment as shown in FIGS. 19*a* and 19*b* with activation of the SMA rods 82 in one bracelet causing sufficient displacement to move the modules to partially cover the valve opening 836, and activation of the SMA rods in both bracelets causing sufficient displacement to cover totally the valve opening 836. The operation of one or more of a plurality of such modules can provide a plurality of partially open states. Each module can be the same or different, and can deliver the same or different amounts of displacement.

Figure 21:
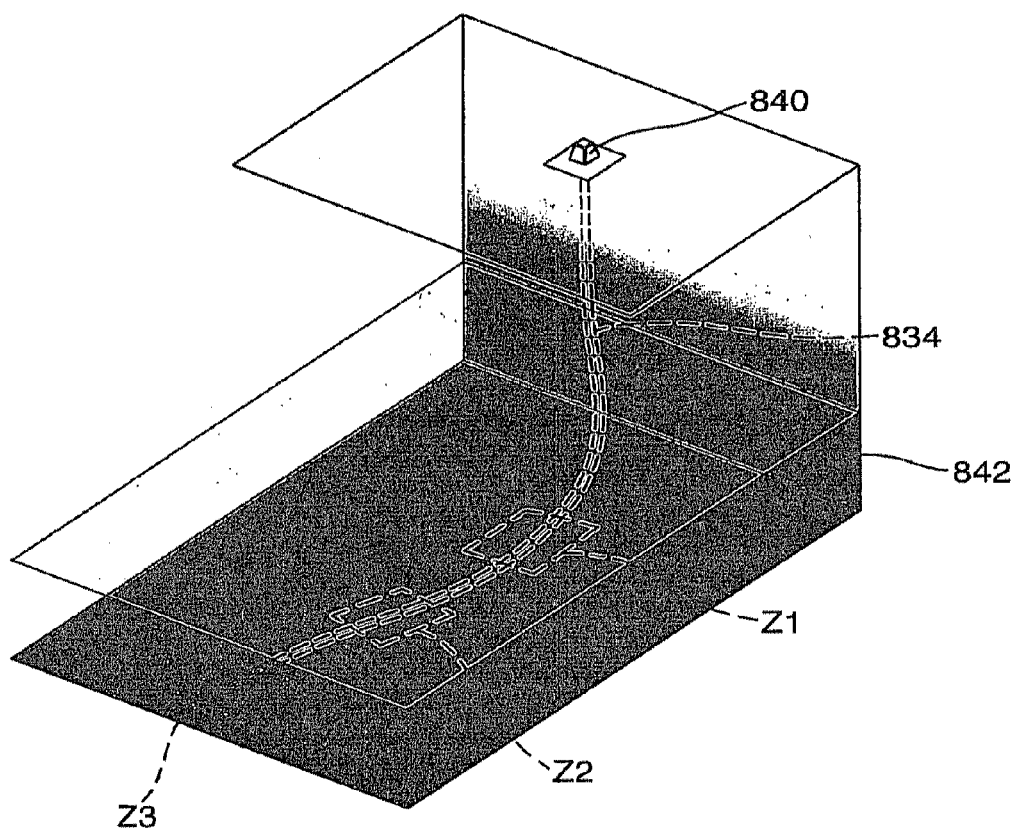
FIG. 21 shows a typical downhole environment where transducers and modules according to the invention may be employed.
Figure 22:
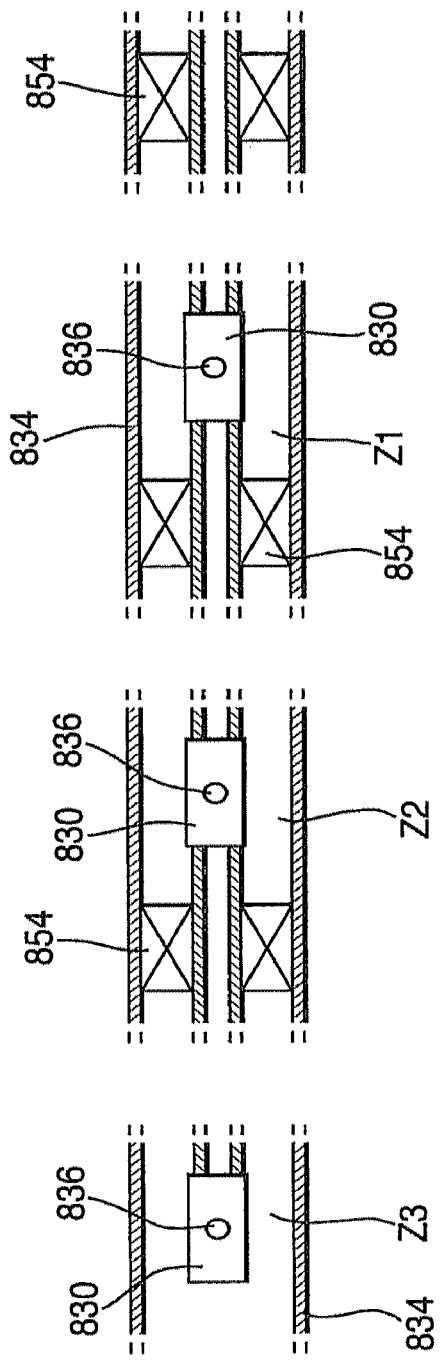
FIG. 22 shows the use of modules according to the invention closing valves in the downhole environment of FIG. 21.

FIG. 21 shows schematically a downhole pipe environment, in which the downhole pipe 834 shown in FIGS. 19 and 20 might typically extend. The pipe 384 descends from a well head 840 into the oil production layer 842 and through zones Z1, Z2, and Z3 of that layer. The pipe 834 running through those zones is shown in FIG. 22. Packers 854 separate the sections of the pipe in the respective zones Z1-Z3, and fluid flow within those separated regions may then be separately controlled. This can be achieved by locating modules 830 as shown in FIG. 19 around respective valves 836 in each of those sections.

In such an environment, zones Z1-Z3 may be several kilometers below the surface. Heat to activate the SMA rods may be provided electrically by umbilical cables running from the well head 840, or by remotely positioned battery packs. Such remote battery packs may be wirelessly and/or remotely controlled. Heat may instead be provided from a non electrical source.

Figure 23:
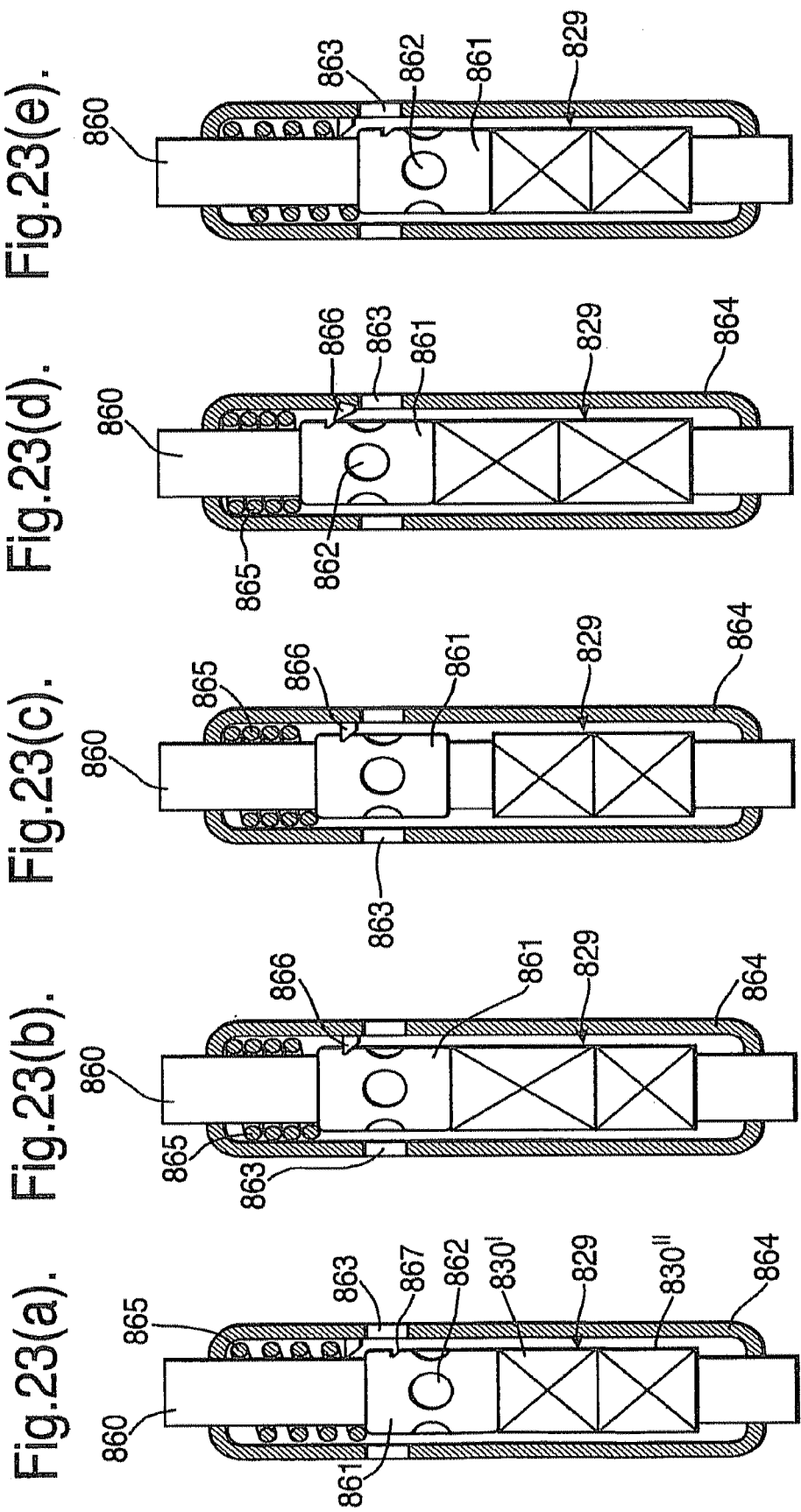

FIGS. 23*a-e* show schematically a series of sequential positions of the double bracelet downhole module 829 of FIG. 20 being operated to open and close a valve in a vertically oriented downhole pipe. In these figures the double bracelet arrangement 829 is shown positioned on production tubing 860 so it can slide up and down the tubing 860. A sliding sleeve 861 rests on the upper bracelet 830', the sliding sleeve 861 containing apertures 862 of a similar size to apertures 863 in a valve casing 864 surrounding the production tubing 860. There is a pressure seal (not shown) between the production tubing 860, and the sliding sleeve 861, and also between the sliding sleeve 861 and the valve casing 864. In this embodiment the upper bracelet 830' is operating as the main actuator for operation of the valve, and the lower bracelet 830" as an actuator to operate a locking mechanism. The operation is as follows. In the starting state the valve is closed as apertures 862 in the sliding sleeve are offset relative to the apertures 863 in the valve casing 864, and there is no power to either bracelet 830. The starting state may be either open or closed; this is an arbitrary choice depending on the application requirements. Power is then supplied to the upper bracelet 830 (which is functioning as the "main actuator"). This causes it to increase in length in the manner described with reference to earlier figures, pushing the sliding sleeve 861 vertically upwards compressing a spring 865 contained in the upper part of the valve casing 864, and aligning the apertures 862 in the sliding sleeve with those 863 in the valve casing 864. This position is shown in FIG. 23*b* which is a power-on/valve-open state. At this point a pivotal locking latch 866 on the inner wall of the valve casing 864 engages a detent 867 in the sliding sleeve 861 to maintain the sliding sleeve 861 in its elevated position. Power is then removed from the bracelet 830', which then recovers its original length, leaving the sliding sleeve in its detained elevated position. This is shown in FIG. 23*c* which is a power-off/valve open position. To close the valve power is provided to both the bracelets 830' and 830" causing both to increase their axial length, and causing the sliding sleeve 861 to be raised further within the valve casing 864 thereby releasing the locking pin 866 from the detent 867. This position is shown in FIG. 23*d* which is a power-on position. The locking mechanism 866 and 867 may comprise any form of releasable locking mechanism, for example, a rocker switch mechanism or the like, as would be known to the man skilled in the art. Finally the power is removed causing both bracelets 830' and 830" to recover to their original length and the spring 865 to return the sliding sleeve 861 back to its original position. This power-off/valve-closed position is shown in FIG. 23*e*. It should be noted that powering is only needed to move the sleeve and not to retain it in either its elevated or lower position.

FIGS. 24-26 show a bail locking mechanism for gripping or securing a module 869, which is similar to the module 830 of FIG. 19, around the downhole pipe 834. Referring first to the figures, the module 869 is positioned to surround the pipe 834. A plurality of steel balls 871 are arranged circumferentially around the inner surface of the lower ring 870 of the module 869. These can protrude inwardly from the inner surface of the ring 870 in order to grip the contained pipe 834 (as shown in FIG. 24 and FIG. 25*a*), or can be retracted away from the contained surface of the pipe 834 in order to release the pipe 834 (as shown in FIG. 25*b*). In order to move from the protruding to the retracted position, the balls move along a wedge or tapered surface 875 which can be seen in FIGS. 25*a* and 25*b*. Referring to those figures the annular ring 870 contains a hollowed portion containing an annular block 874 that is movable relative to the ring 870 and which presents a cylindrical wedge or tapered surface 875 towards the contained pipe 834. The wedge shaped surface tapers towards the contained pipe 834 at its lower extreme in the orientation illustrated. The upper end of the block 874 is in contact with a shape memory alloy (SMA) rod 872, and the lower end of the block 874 is in contact with a compression spring 873. The compression spring 873 acts to urge the block 874 upwards in the absence of any other forces. The shape memory alloy rod 872 can be heated (for example by a coiled heater wire wrapped around it) causing it to increase in length, this increase in length being sufficient to overcome the force of the compression spring 873 and hence move the block 874 downwards. The steel balls 871 can roll along the tapered surface 875, and the inwardly facing surface of the ring 870 contains circular openings 879 appropriately sized to allow the balls 871 to project therethrough.

FIG. 25*a*, as described above, shows the steel balls 871 protruding from openings 879 in the lower annular ring 832 of the module 869 to grip the pipe 834. The steel balls 871 are urged into this position by compression springs 873, as previously described, which act axially on the block 874, which includes the wedge shaped surface 875, to urge the block 874 in an upward direction. This upward movement relative to the ring 870 causes the balls 871 to roll along the wedge shaped surface 875, move through the openings 879, and protrude from the inner surface of the module 869 to grip the pipe 834. In order to release the pipe 834, the steel balls 871 can then be retracted by activating the SMA rods 872 to cause them to lengthen. The lengthening of the SMA rods 872 overcomes the force of the compression springs 873 and causes the block 874 to move downwards within the annular ring 870, and hence causes the steel balls 871 to roll upwards along the wedge shaped surface 875 in the orientation shown in FIG. 25*b*. The steel bails 871 thus move from a position where they protrude from the inner surface of the ring 870 and therefore lock or grip the module 869 to the pipe 834 (as shown in FIG. 25*a*) to a position where they are retracted and no longer protrude the inner surface of the ring 870 (as shown in FIG. 25*b*). In the latter position, they release the pipe 834 and allow the module 869 to slide axially relative to the pipe 834. This unlocked or released position is shown in FIG. 25b. The balls 871 can grip directly onto the walls of pipe 834 and rely on frictional forces to maintain the lock mechanism, or alternatively, a cylindrical sleeve with spherical indentations corresponding to the positions of the steel balls can be fitted onto the wall of pipe 834 and the valve mechanism moved over it. The lengthening shape memory alloy rods 872 act as a trigger to move the block 834 comprising the wedge shaped surface 875 relative to the annular ring 870. When heat to the SMA trigger rods 872 is removed, the spring 873 together with recovery of the SMA rod 872 returns the block 874 comprising the wedge surface 875 and hence the steel balls 871 to the positions shown in FIG. 25a. It will be appreciated that the trigger SMA rods 872 which drive the gripping mechanism are actuated separately from the SMA rods driving the flextensional transducers that increase the axial length of the module 869. In the drawings, for simplicity, the ball/wedge/SMA trigger rod mechanism is shown in the lower annular ring 870 only. However, a similar mechanism may also be provided for the upper annular ring 870. It is noted that, in this embodiment, power is needed to the trigger SMA rods 872 only to release the module 869 from the pipe 834, and the "power-off" state is a gripping state.

As noted above, the embodiment shown in FIGS. 25a and 25b is in its gripping state when power to heat SMA trigger rods 872 is off, and the gripping mechanism is released by activating the trigger SMA rods 872 ("power on" state).

Figure 27B:
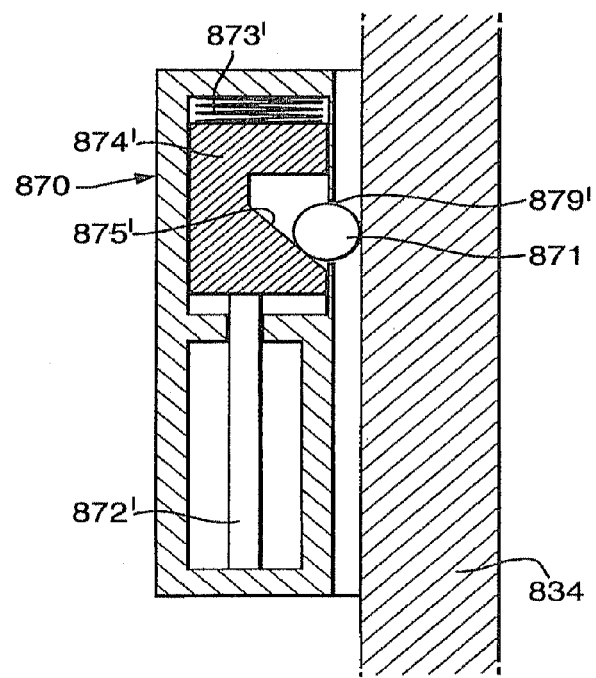

FIGS. 27a and 27b show an alternative configuration in which a plurality of steel balls grab/lock/grip the contained pipe 834 upon activating a set of trigger SMA rods (power on) and release the contained pipe when the trigger SMA rods are deactivated (power off). In these figures, like parts are given like reference numbers to those in FIGS. 25a and b but with a prime notation. In this case the block 874' presenting the cylindrical wedge shaped surface 875' to the contained pipe 834 is contained in the upper annular ring 870 of the module 869. As before the wedge shaped surface 875' slopes towards the contained pipe 834 at its lower extreme. The lower end of the block 874' is in contact with a shape memory alloy (SMA) rod 872', and the upper end of the block 874' is in contact with a compression spring 873'. The compression spring 873' acts to urge the block 874' downwards in the absence of any other forces, and the shape memory alloy rod 872' can be heated (for example by a coiled heater wire wrapped around it) causing it to increase in length. The increase in length of rod 872' is sufficient to overcome the force of the compression spring 873' and hence move the block 874' upwards. The steel balls 871 can roll along the tapered surface 875', and the inwardly facing surface of the ring 870' contains circular openings 879' appropriately sized to allow the balls 871 to project therethrough.

In the embodiment shown in FIGS. 27a the power to SMA trigger rods 872' is off and the compression springs urge the block 874' downwards and so the steel balls 871 roll along the wedge shaped slope 875' away from the surface of the pipe 834. When the SMA trigger rods 872' are activated and lengthen, as shown in FIG. 27b, the block 874' comprising the wedge shaped surface 875' moves upwards relative to the ring 870 and the balls 871 are caused to roll along the wedge surface 875, protrude through openings 879' in the upper ring 870 to grip the contained pipe 834.

FIG. 28 is a cross section of another embodiment of gripping or locking mechanism which is located within a pipe 834 to be gripped. Thus in this case a module 869 similar to that shown in FIG. 19 is positioned within a pipe 834, and projecting/retracting steel balls 871 are provided on the outwardly facing surface of the annular rings 870 of the module 869. The gripping or locking mechanism operates in a similar manner to that already described with reference to FIGS. 24-27, with gripping balls 871 being triggered by SMA rods 872 to project from or to retract back into the surface of the module 869. It can operate to grip the pipe 834 when there is no power to the SMA trigger rods 872, and to release the pipe 834 when there is power to the trigger SMA rods 872, or vice versa, as described with reference to the earlier embodiments.

In the embodiments described with reference to FIGS. 24-28 three trigger SMA rods 872 are shown. However more rods can be added if higher grab forces are required, or less if lower grab forces are required. Similarly, while spherical gripping balls are shown, any shaped protruding member that can move along, especially roll or slide along, the wedge shaped surface could be used, e.g. cylindrical rollers or dumbbells.

Figure 29A:
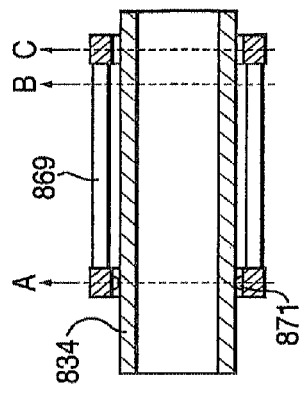
Figure 29B:
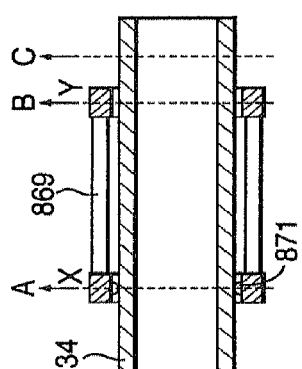
Figure 29C:
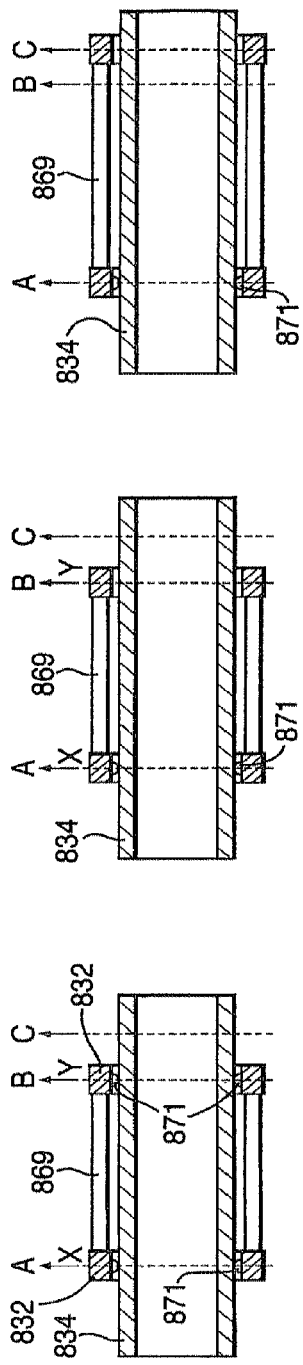
Figure 29D:
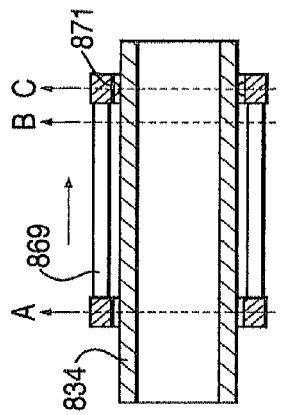
Figure 29E:
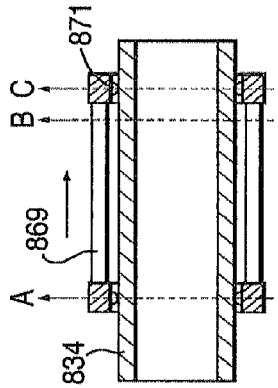
Figure 29F:
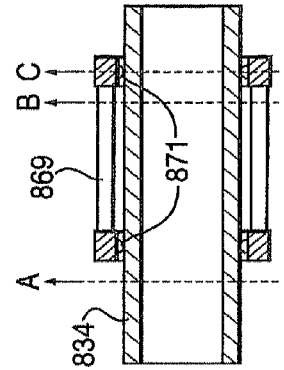
Figure 29G:
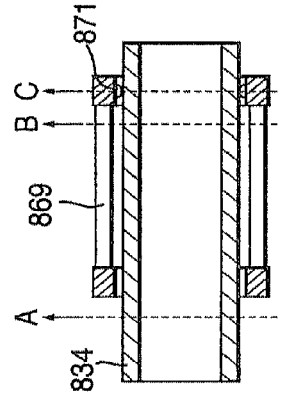

FIGS. 29a-e are cross sectional views that show in sequential steps the module 869 of FIGS. 24-26 in one possible mode of operation, moving along a downhole pipe 834 to open, partially close, or completely close the valve opening (not shown) in the downhole pipe 834. The pipe 834 is shown in a horizontal position, but would typically be vertical. In FIG. 29a there is no power to trigger SMA rods and so the balls 871 on both rings 832 grip the surface of the pipe 834. Lines A, B on the Figure show the circumferences of the pipe 834 which are gripped at this stage by left and right hand annular rings 832 of the module 869. Left and right refer here to the orientation in the illustrated figures. These would correspond to "lower" and "upper" in the typical vertical orientation. Power is then supplied to the SMA rods actuating the gripping balls 871 of the right hand annular ring 832, causing those gripping balls 871 to be released. This position is shown in FIG. 29b. The flextensional transducer SMA inner driver members are then actuated, causing the module 839 to increase in length, thereby moving the released right hand annular ring 832 to the right. This axially extended position is shown in FIG. 29c. The next step is to remove the power to the trigger SMA rods controlling the gripping mechanism to the right hand angular ring 832 of the module 869, causing the steel bails within the ring to grip the pipe 834 again. The gripped position is shown in FIG. 29d. Lines A, C on FIG. 29d show the circumferences of the pipe 834 which are gripped at this stage by left and right hand annular rings 832 of the module 869 respectively. C is to the right of line B. The next stage is to activate the trigger SMA rods controlling the gripping balls 871 of the left hand annular ring 832, causing those gripping bails 871 to be released. This means that the module 869 now grips the pipe at its right hand ring 832, but not its left hand ring 832 (this is shown in FIG. 29e). The next stage is to remove the power from the flextensional transducer SMA driver rods, causing the module 869 to revert to its original length. The new position is shown in FIG. 29f. Finally the SMA rods actuating the balls in the left hand ring 832 are deactivated, causing those balls to grip the pipe 834 at the left extreme of the module 869. The final position is shown in FIG. 29g. As can be seen by comparing FIG. 29g to FIG. 29a this sequence causes the gripped pipe to move along the pipe to a new gripped position further to the right. The steps can be repeated for successive movement to the right, or for movement to the left the sequence of powering the trigger SMA rods actuating the ball grippers can be reversed. Thus these movements may be used to move the module 869 relative to the downhole pipe to partially close, then close, then reopen a valve opening in the pipe. An advantageous feature of this design is that the steel balls grip the pipe 834 when their actuating SMA rods are not powered. Power to actuate the rods is only applied to release the ball gripping mechanisms.

FIGS. 30a-c show another mechanism for moving a module 830 along a downhole pipe 834 to open and close a valve opening (not shown) in the downhole pipe 834. This comprises the same module as shown in FIG. 19 with upper and lower annular rings 832 and curved flextensional transducers 801 mechanically coupling those rings. The module also includes a rocker switch 890 which rocks about a pivot point 891, which is fixed to the downhole pipe 834, and opposite ends 892 of the rocker switch 890 engage detents 893 in flanges 894 that project axially along the cylindrical surface of the module from each of the upper and lower annular rings 832, towards each other. A spring 895 acting towards the mid point of the rocker switch 890 aids movement of the rocker switch. The standby position is shown in FIG. 30a with the lower end 892 of the rocker switch 890 engaging the recess 893 in the lower flange 894. Lines A and B indicate the circumferences of the pipe 834 which are beneath the lower and upper rings 832 respectively. The next stage is to activate the SMA rods which are the inner drivers of the flextensional transducers 801, causing the module to increase in length as shown in FIG. 30b. The line C (higher than B) marks circumference of the pipe 834 which is now beneath the upper ring 832. The axial lengthening of the module 801 causes the spring 895 to move the rocker switch 890 so that the upper end 892 of the rocker switch 890 engages the recess 893 in the upper flange 894, thereby holding the upper ring 832 in place relative to the pipe 834. The final step is to remove the power to the SMA rods driving the flextensional transducers 801, causing the module to shrink in length, and the lower ring 832 (which is no longer held by the rocker), to move upwards. In this position the valve is closed. This is shown in FIG. 30c. To return the module to its original position the transducer SMA rods can once again be activated.

The present invention further provides any novel feature or combination of features hereinbefore described.

The invention claimed is:

1. A flextensional transducer comprising at least one inner elongate driver member, contained within and mechanically coupled to an inner flextensional housing shell, which is itself nested within an outer flextensional housing shell; the inner shell comprising a pair of contact portions and a pair of transmission portions, the contact portions being located so that they are in mechanical contact with opposite ends of the at least one inner driver member, and the transmission portions being located on opposite sides of the inner housing shell between the contact portions; and the outer housing shell being arranged so that the transmission portions of the inner housing shell act as bridging driver members between the said inner and outer housing shells, flexure of the outer flextensional housing shell being driven, on actuation of the transducer, by movement of the said bridging driver members, or vice versa.

2. A transducer according to claim 1, wherein the inner housing shell comprises orthogonally disposed primary and secondary shell axes, wherein the said inner driver member axis is coincident with the primary axis of the inner housing shell, and the said bridging driver members lie along a common axis that is coincident with the said secondary axis of the inner housing shell.

3. A transducer according to claim 2, wherein the outer housing shell also comprises orthogonally disposed primary and secondary axes, the primary axis of the outer shell being coincident with the secondary axis of the inner shell, and the secondary axis of the outer shell being in a direction that is orthogonal to both the primary and secondary axes of the inner shell.

4. A transducer according to claim 2, wherein the outer housing shell also comprises orthogonally disposed primary and secondary axes, the primary axis of the outer shell being coincident with the secondary axis of the inner shell, and the secondary axis of the outer shell being coincident with the primary axis of the inner shell.

5. A transducer according to claim 3, wherein the outer flextensional housing shell also comprises a pair of contact portions and a pair of transmission portions, the bridging driver members contacting the contact portions of the outer housing shell along the primary axis of the outer housing shell, and the transmission portions of the outer housing shell being located on the secondary axis of the outer housing shell.

6. A flextensional transducer capable of acting as an actuator or sensor and comprising at least one inner elongate driver member contained within, and mechanically coupled to an inner flextensional housing shell that is itself nested within, and mechanically coupled via opposing bridging members located on the inner shell, to an outer flextensional housing shell, whereby; when acting as an actuator, an input displacement, or applied force, generated by the inner driver member in a first direction along its axis generates via flexure of the inner shell a related displacement/force in a second, orthogonal direction in the opposing bridging members that couple the shells together, which bridging members act as driver members for the outer housing shell and thereby generate, via flexure of the outer shell, a related displacement/force in opposing output members located on the outer shell in a third direction; and, when acting as a sensor, an input displacement or applied force generated by a relative displacement or force between opposing members of the outer shell in the said third direction, generates via flexure of the outer shell, a related displacement/force in the said second direction in the bridging members that couple the shell together, which bridging members act on the inner housing shell to generate via flexure of the inner shell a related displacement/force, between opposing portions of the inner shell which contact opposite ends of the at least one inner elongate driver member, along the axis of the inner elongate driver member, wherein the inner elongate driver member is subjected to a strain or force and can generate a signal in response to that strain or force; the said third direction being either orthogonal to the first and second directions, or parallel with the first direction.

7. A transducer according to claim 1, comprising two or more inner driver members extending parallel to each other within the inner flextensional housing shell, the contact portions of the inner housing shell contacting opposite ends of each of the inner driver members.

8. A transducer according to claim 1, comprising a third flextensional housing shell surrounding the said outer flextensional housing shell to provide an outermost flextensional housing shell, the outer housing shell and outermost flextensional housing shell being in mechanical contact with each other so that on actuation flexure of the outer flextensional housing causes flexure of the outermost flextensional housing shell, or vice versa.

9. A transducer according to claim 1, wherein the inner driver member is electrically activatable.

10. A transducer according to claim 1, wherein the inner driver member comprises a smart material.

11. A transducer according to claim 1, that can be stored at room temperature and activated and operated at an elevated temperature in excess of 200° C., wherein the said bridging driver member between the said inner and outer flextensional housing shells comprises a material having a different coefficient of thermal expansion from that of adjacent parts of the said inner and outer flextensional housing shells.

12. A transducer according to claim 11, wherein the said bridging driver member comprises a material having a higher coefficient of thermal expansion than the adjacent parts of the said inner and outer flextensional housing shells.

13. A flextensional transducer according to claim 12, wherein the said thermal compensating bridging member expands more than the adjacent parts of the inner and outer housing shells as the temperature increases up to and at the elevated temperature, causing the inner housing shell to flex so as to urge the contact portions of the inner housing shell towards each other to compensate for any greater thermal expansion of the inner housing shell relative to that of the inner driver member.

14. A method of using a transducer according to claim 1 as an actuator, the method comprising applying an external stimulus to the inner driver member to cause it to change in length thereby causing flexure of the inner and subsequently the outer housing shell.

15. A method of using a transducer according claim 1 as a sensor to detect displacement, comprising locating the outer housing shell adjacent to the displacement to be detected, wherein, in use, said displacement to be detected causes flexure of the outer housing shell, which is transmitted through nested housing shells to cause a change in length of the inner driver member, the method also comprising detecting said change in length of the inner driver member.

16. A downhole apparatus comprising a transducer according to claim 1.

17. A transducer according to claim 1 in which the at least one inner elongate driver member comprises a shape memory alloy rod.

\* \* \* \* \*